(12) United States Patent
Petrie et al.

(10) Patent No.: US 11,228,466 B2
(45) Date of Patent: Jan. 18, 2022

(54) DIGITAL CAPACITIVE ISOLATOR

(71) Applicant: Allegro MicroSystems, LLC, Manchester, NH (US)

(72) Inventors: Craig S. Petrie, Merrimack, NH (US); Srujan Shivanakere, Nashua, NH (US)

(73) Assignee: Allegro MicroSystems, LLC, Manchester, NH (US)

( * ) Notice: Subject to any disclaimer, the term of this patent is extended or adjusted under 35 U.S.C. 154(b) by 246 days.

(21) Appl. No.: 16/526,081

(22) Filed: Jul. 30, 2019

(65) Prior Publication Data
US 2021/0036896 A1  Feb. 4, 2021

(51) Int. Cl.
*H02M 3/06* (2006.01)
*H04L 25/02* (2006.01)

(52) U.S. Cl.
CPC .......... *H04L 25/0266* (2013.01); *H02M 3/06* (2013.01)

(58) Field of Classification Search
USPC ......................................... 307/109
See application file for complete search history.

(56) References Cited

U.S. PATENT DOCUMENTS

| | | | | |
|---|---|---|---|---|
| 4,748,419 A | * | 5/1988 | Somerville | H03G 11/002 330/10 |
| 8,786,279 B2 | | 7/2014 | Petrie | |
| 9,473,163 B1 | * | 10/2016 | Tsai | H03F 3/45237 |
| 9,514,788 B1 | * | 12/2016 | Kim | G11C 8/08 |
| 2018/0131341 A1 | * | 5/2018 | Nallamothu | H03K 5/02 |
| 2020/0014463 A1 | * | 1/2020 | Tanaka | H03F 1/0277 |

OTHER PUBLICATIONS

Daughton, "Spin-Dependent Sensors;" Proceedings of the IEEE, vol. 91, No. 5; May 2003; 6 Pages.
U.S. Appl. No. 16/365,855, filed Mar. 27, 2019, Daubert, et al.
U.S. Appl. No. 16/511,104, filed Jul. 15, 2019, Petrie et al.
Kanekawa, et al.; "An Analog Front-End LSI with On-Chip Isolator for V.90 56kbps Modems"; 2000 Custom Integrated Circuits Conference; pp. 327-330; May 2000; 4 Pages.

* cited by examiner

*Primary Examiner* — Toan T Vu
*Assistant Examiner* — Xuan Ly
(74) *Attorney, Agent, or Firm* — Daly, Crowley, Mofford & Durkee, LLP

(57) ABSTRACT

An isolation circuit that isolates a driver circuit that is biased at a first common mode voltage from a detection circuit that is biased at a second common mode voltage using isolation capacitors. The detection circuit includes a transimpedance amplifier having improved susceptibility to transient common-mode input signals and improved insensitivity to parasitic capacitance on the isolation capacitor terminals. Included within the transimpedance amplifier are circuits for mirroring current to convert the input current from the isolation capacitors into a voltage value and to amplify that voltage value. The transimpedance amplifier outputs a differential voltage value that is held by a latch circuit so that a comparator in the detection circuit can process the differential voltage value and output a differential signal with fully restored logic levels.

27 Claims, 14 Drawing Sheets

DIGITAL CAPACITIVE ISOLATOR

BACKGROUND

Capacitive isolators can be used to communicate electrical signals between two systems, such as a transmitter and a receiver, biased at different common mode voltages. One challenge in capacitive isolator design is assuring insusceptibility to transient common-mode input signals, as may be referred to as Common-Mode Transient Immunity (CMTI). Common-mode input signals can pass through the isolation capacitors in the form of common-mode current flow through the capacitors as the common mode input voltage changes. This common-mode variation between the two systems becomes more problematic for the receiver system with faster common-mode transitions at the isolator input. Additionally, parasitic capacitance on the receiver side of the isolation capacitor can adversely attenuate the communicated signal, thereby making accurate recovery of the input signal more challenging.

One example application for capacitive isolators is high side motor winding current sensing in motor controllers, in which current through one or more motor windings or phases is monitored by measuring a voltage across a sense resistor coupled in series or "in-line" with the motor winding. Such current sensors can generate a digital output signal indicative of the motor phase current as may be used to control motor position and speed.

With the desire to represent the motor winding current measurement digitally so that a digital control unit can provide the motor drive signals, an isolator can be used to communicate a converted digital signal from a first system referenced to a common mode voltage that moves with the motor winding voltage (i.e., an input system) to a second system that includes detection circuitry (i.e., an output system). In this context, the isolator can be referred to as an "output isolator." Similar isolators can be used when communicating signals in the opposite direction, from the detection circuitry to the motor control circuitry in which case the isolator can be referred to as an "input isolator."

Isolator design can be complicated by relatively large common mode voltages experienced by the sense resistor. For example, the common mode voltage at the sense resistor terminals can swing between ground and a high input supply voltage level. Further, because of the inductive nature of motor windings, this voltage can in fact swing beyond the supply voltage range.

SUMMARY

Described herein is a circuit for transmitting a digitized input signal across a capacitive isolation boundary that uses a transimpedance amplifier as a detection mechanism. Each side of the capacitive isolation boundary has a common mode voltage isolated from the common mode voltage of the other side, which common mode voltage may or may not be different than each other. The circuit, however, is configured to resolve an input signal despite large and quick common mode voltage transitions during the transmission of the digitized input signal across the capacitive isolation boundary.

Embodiments include an apparatus having a driver that is powered by a first supply that has a first common mode voltage and is configured to convert a digital input signal that has a logic level into a driver differential output voltage. A detection circuit that is powered by a second supply that has a second common mode voltage, can include a transimpedance amplifier that has differential inputs and that is configured to convert a differential input current at the differential inputs into a differential output voltage at differential outputs of the transimpedance amplifier. The apparatus further includes a pair of isolation capacitors that each have a first terminal that is coupled to the driver differential output voltage and a second terminal coupled to the differential inputs of the transimpedance amplifier.

In some instances, the second common mode voltage of the second supply is different than the first common mode voltage of the first supply.

The detection circuit further can include a comparator that has inputs that respond to the differential output voltage and that have an output at which is provided a digital output signal that has a logic level with a predetermined relationship to a logic level of the digital input signal.

The transimpedance amplifier can include, for each of the differential inputs, a first FET that is configured to conduct a positive input current at the respective differential input, and a second FET that is coupled to the first FET and to the respective differential input and that is configured to conduct a negative input current at the respective differential input. The transimpedance amplifier can also include a first current mirror that receives a first current that is generated by the first FET to generate a first mirrored version of the first current, and a second current mirror that receives a second current that is generated by the second FET to generate a second mirrored version of the second current.

In some embodiments, the transimpedance amplifier can include a resistor that is coupled to the first and second current mirror for each of the differential inputs. This resistor can have a first terminal coupled to the respective current mirrors and a second terminal that can be coupled to a common mode voltage node. In these embodiments, the differential output voltage can be generated by the first mirrored version of the first current and the second mirrored version of the second current flowing through the resistors. In still further embodiments, a gate terminal of the first FET for each of the differential inputs can be coupled together and to a first bias voltage, and a gate terminal of the second FET for each of the differential inputs can be coupled together and to a second bias voltage. The apparatus can further include a bias generator that generates the first bias voltage and the second bias voltage and that includes a quiescent current sink that is coupled to a first diode-connected FET that replicates the first FET. A second diode-connected FET that replicates the second FET and has a source terminal that is coupled to a source terminal of the first diode-connected FET can be coupled to a quiescent current source. The first bias voltage can be provided at a gate terminal of the first diode-connected FET and the second bias voltage can be provided at a gate terminal of the second diode-connected FET.

In other instances, the transimpedance amplifier can include, coupled to at least one of the current mirrors for each of the differential inputs, a current copying FET and a second current mirror configured that sums the differential input current and tends to cancel a common mode input current at the differential outputs of the transimpedance amplifier.

The detection circuit can further include a latch that is coupled to the differential outputs of the transimpedance amplifier and to the comparator. The latch can be configured to hold the differential output voltage at a predetermined voltage level in response to the detection of a change in the differential output voltage of greater than the predetermined voltage level. In some instances, the latch can include a latch current source, a first differential pair that is coupled to the latch current source, a second differential pair that is coupled to the first differential pair at the inputs of the latch, and a latch current sink that can be coupled to the second differential pair and that has a value substantially equal to a value of the latch current source. The latch current source and the latch current sink can be controlled by a bandgap voltage that is coupled across a resistor. The value of the latch current source, the value of the latch current sink, and a value of the resistor can be selected to establish the predetermined voltage level.

Further described herein is a method that converts a digital input signal that has a logic level into a driver differential output voltage, using a driver that is powered by a first supply that has a first common mode voltage. A transimpedance amplifier that has differential inputs can convert a differential input current at the differential inputs into a differential output voltage at the differential outputs of the transimpedance amplifier. A pair of isolation capacitors can isolate the driver differential output voltage from the differential inputs of the transimpedance amplifier.

In some instances, the differential input current can be converted using the transimpedance amplifier of a detection circuit powered by a second supply having a second common mode voltage. In other instances, each isolation capacitor can have a first terminal coupled to the driver differential output voltage and a second terminal coupled to the differential inputs of the transimpedance amplifier.

Still further described herein is an apparatus that includes a means for converting a digital input signal that has a logic level into a driver differential output voltage. Also included is a means for converting, by a transimpedance amplifier having differential inputs, a differential input current at the differential inputs into a differential output voltage at the differential outputs of the transimpedance amplifier. The apparatus further includes a means for isolating the driver differential output voltage from the differential inputs of the transimpedance amplifier.

The means for converting the digital input signal can include a driver that is powered by a first supply that has a first common mode voltage. The means for converting the differential input current can include a detection circuit that is powered by a second supply that has a second common mode voltage. In some instances, the detection circuit can include the transimpedance amplifier. The means for isolating can include a pair of isolation capacitors that each have a first terminal that is coupled to the driver differential output voltage and a second terminal that is coupled to the differential inputs of the transimpedance amplifier.

In some instances, the transimpedance amplifier can include, for each of the differential inputs, a means for conducting a positive input current at a first differential input, a means for conducting a negative input current at a second differential input, a means for generating a first mirrored version of the positive input current, and a means for generating a second mirrored version of the negative input current.

BRIEF DESCRIPTION OF THE DRAWINGS

The foregoing and other objects, features and advantages will be apparent from the following more particular description of the embodiments and the appended claims, as illustrated in the accompanying drawings in which like reference characters refer to the same parts throughout the detailed description. Reference characters introduced in a figure may be repeated in one or more subsequent figures without additional description in the detailed description in order to provide context for other features of the described embodiments.

DETAILED DESCRIPTION

Figure 1:
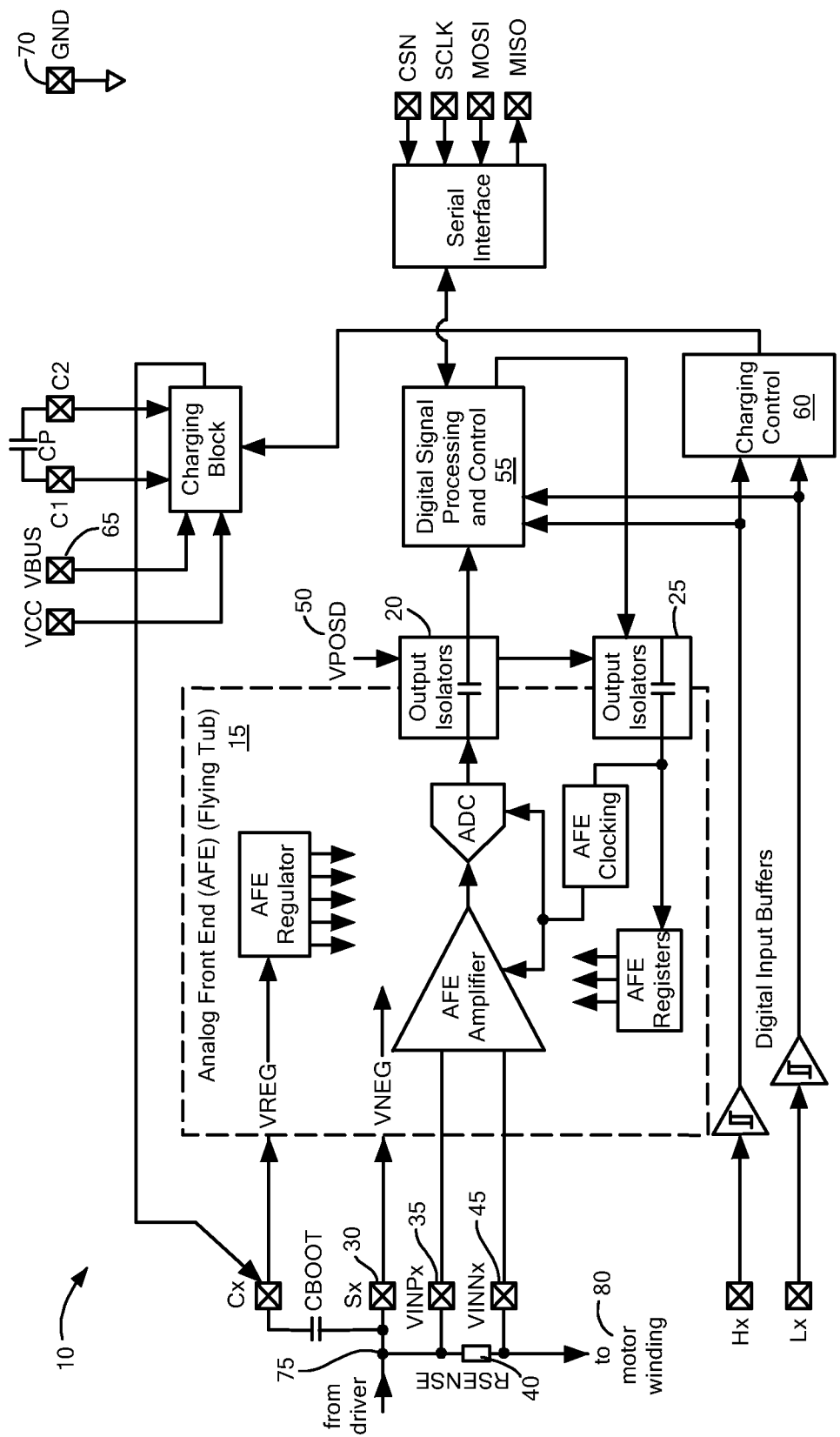
FIG. 1 is a block diagram depicting a current sensing system.

As used herein, the "common mode signal" of a circuit is the average of the two signals comprising a differential input or output signal.

Motors are often controlled in part by sensing or measuring the current in one or more motor windings by placing a resistor in series with one of the motor terminals and measuring the voltage across the resistor. This current sensing resistor can be integrated into a circuit relative to the load (such as the motor winding 80 in FIG. 1), and a source potential (such as VBUS 65 or GND 70 in FIG. 1), such that the resistor is either at a higher or lower potential than the load. When the resistor is placed at a higher potential (such as the resistor 40 in FIG. 1), the resistor is commonly referred to as a high-side current sensing resistor.

A high-side current sensing resistor does not have a terminal connected to ground, therefore the common mode voltage at the resistor changes significantly as the signal outputted by a motor driver changes. In emerging automotive applications, the voltage sensed by a high-side current sensing resistor can range from eighty (80) volts to as low as negative five (−5) or negative fifteen (−15) volts, and can be a nominal forty-eight (48) volts or zero (0) volts. This wide range of common mode voltage presents challenges because the differential voltage measured by the current sensing resistor is typically in a range of tens of millivolts.

Illustrated in FIG. 1 is a block diagram of a current sensing integrated chip (IC) 10 for sensing the current through one or more motor windings 80 of a motor (not shown) using a resistor, $R_{Sense}$ 40, placed in series with output from a motor driver 75 and a winding of the motor 80. The current sensing IC 10 measures current that flows from the motor driver 75 to a motor winding 80 by measuring the voltage across $R_{Sense}$ 40 at the connections VINPx 35 and VINNx 45. $R_{Sense}$ 40 can be any resistor having any resistance value. In some embodiments, $R_{Sense}$ 40 can have a resistance value of approximately 0.5 milliohms. In other embodiments, $R_{Sense}$ 40 can have a resistance value less than 10 ohms but greater than 0.1 milliohms. $R_{Sense}$ 40 can comprise one or more resistors coupled in parallel or in series to provide a resistor network that has a total resistance less than 100 ohms.

Node $S_X$ 30 is electrically connected to a node of the motor driver 75 which is configured to selectively couple motor windings (e.g., winding 80) to supply voltage terminals (e.g. VBUS 65 and GND 70) by applying PWM control signals to switches of the motor driver 75 to control the position of the motor's rotor. In an ideal system, the potential at node Sx 30 fluctuates between zero (0) volts and a VBUS 65 voltage of forty-eight (48) volts, however because the motor windings are inductive and the motor driver switches can transition rapidly, the actual potential at node Sx 30 can often exceed forty-eight (48) volts or fall below zero (0) volts. In some instances, the potential at node Sx 30 can dip as low as negative five (−5) volts or negative fifteen (−15) volts and reach as high as eighty (80) volts. Common mode voltage is the average of two or more input voltages (i.e. VBUS 65 and ground), changes in the common mode voltage over time are referred to as common mode transient voltages. These common mode transient voltages can exceed or stay within a range of input voltages.

The current sensor 10 is manufactured using a high voltage BiCMOS process that combines bipolar technology and complementary metal-oxide semiconductor manufacturing processes. This high voltage BiCMOS process has epitaxial tubs or "epi tubs" that are made of n-type material and are biased at a higher potential than the p-type substrate of the current sensor IC 10 which is connected to ground. The analog front end (AFE) or "flying tub" 15 is one of these epi tubs and can be biased such that its potential is fifteen (15) volts greater than the potential at node Sx 30 as described in co-pending U.S. patent application Ser. No. 16/365,855 entitled "Current Sensor Integrated Circuit with Common Mode Voltage Rejection" filed on Mar. 27, 2019 and incorporated by reference herein in its entirety. The potential at node Sx 30 can drop as low as fifteen (15) volts below ground, i.e. negative fifteen volts, therefore by biasing the flying tub 15 fifteen volts above Sx 30, an undesired forward bias of the epi-substrate junction is prevented.

Digital communication between the digital signal processing and control block 55 and the flying tub circuit 15 requires level-translating isolators such as the input isolators 25 and the output isolators 20 that capacitively couple the digital signals across the high voltage interface between the digital signal processing and control block 55 and the flying tub circuit 15. The digital signal processing and control block 55 receives and provides digital signals that swing between GND 70 and the value of VPOSD 50 (e.g., 3.3 volts). In the flying tub 15, the input and output signals swing between the potential at node Sx 30 and a potential defined by the potential at Sx 30 plus the value of VPOSD 50. The potential at node Sx 30 can be GND 70 or the value of VBUS 65, the potential can exceed or fall below a voltage range defined by GND 70 to VBUS 65 and, in some instances during transitions, can temporarily reside at any voltage within this voltage range.

Figure 2:
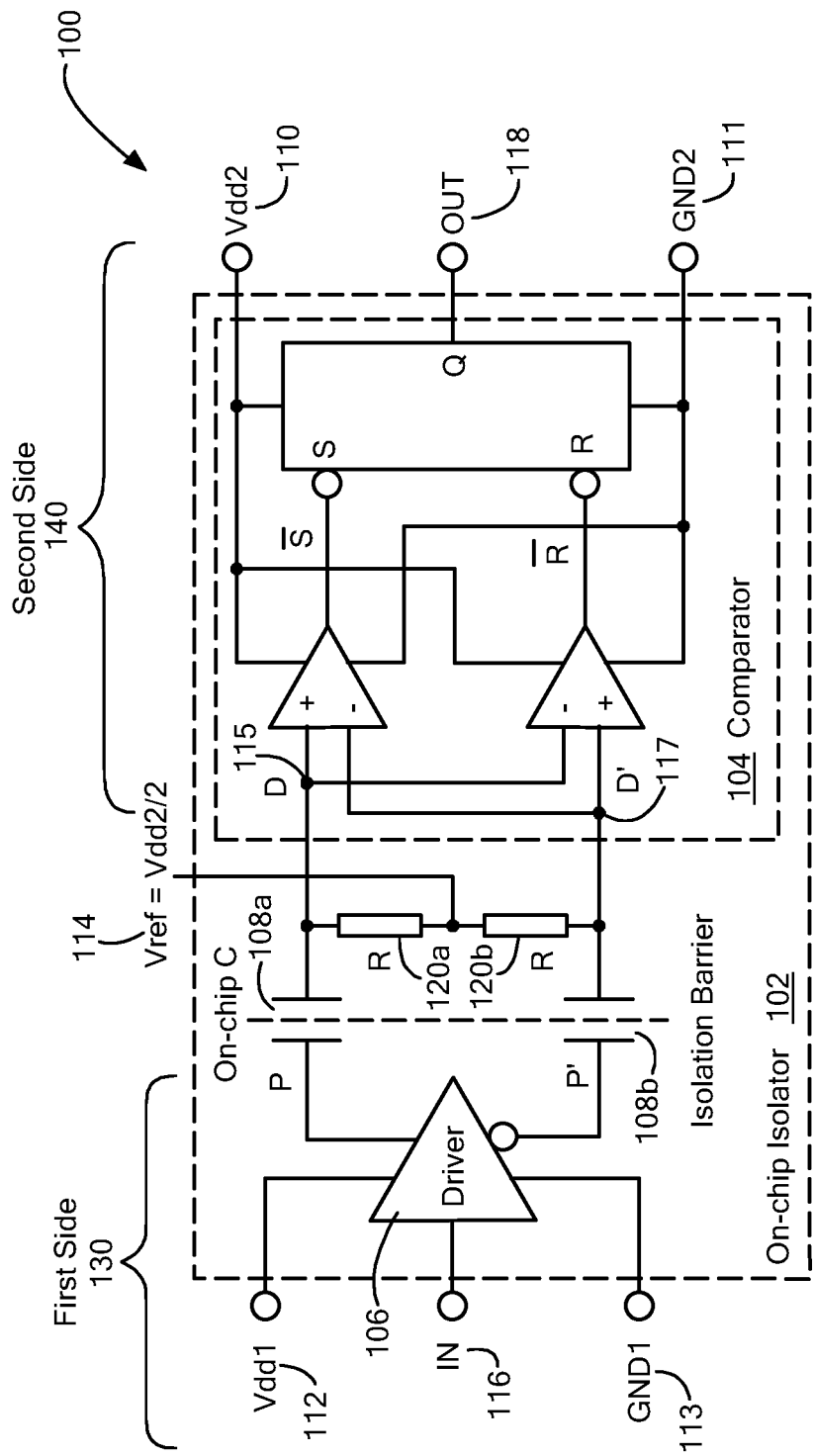
FIG. 2 is a circuit diagram depicting a prior art capacitive isolator.

There exist prior art methods that provide level-translating isolation such as that illustrated in FIG. 2 and described in N. Kanewawa, et al., "An Analog Front-End LSI with On-Chip Isolator for V.90 56 kbps Modems," Proc. IEEE 2000 Custom Integrated Circuits Conference, pp. 327-330, May 2000. The isolation circuit 100 of FIG. 2 has a first side 130 that is biased at a first common mode voltage, and a second side 140 that is biased at a second common mode voltage that is, at times different than the first common mode voltage. The two sides are separated by a capacitive isolator that includes a first capacitor 108*a* and a second capacitor 108*b*. A reference voltage, Vref 114, generated by dividing Vdd2 110 in half using a voltage divider that includes a first resistor 120*a* and a second resistor 120*b*, fixes the common mode voltage at the receiver side of the isolation capacitors A signal is received on the first side 130 at the IN node 116 and processed by a driver 106 that generates logic signals using supply signals Vdd1 112 and GND1 113. The generated complementary logic signals, P and P', are biased with a first common mode voltage defined by the voltage range of Vdd1 112 to GND1 113. These complementary logic signals are transferred to the other side of the capacitive isolation barrier where they are received on corresponding node D 115 and node D' 117 such that the P logic signal is received on node D 115 and the P' logic signal is received on node D' 117. The voltage across the capacitors 108*a*, 108*b* of the isolation barrier is approximately the difference between the first common voltage of the first side 130 and the second common mode voltage of the second side 140. The transferred digital signals are received on the second side 140 by a receiver circuit 104 that uses supply signals Vdd2 110 and GND2 111 and is biased at a second common mode voltage that is defined by the voltage range of Vdd2 110 to GND2 111. Once processed by the receiver circuit 104 and now biased at the second common mode voltage of the second side 140, the transferred digital signals are output at node OUT 118.

Figure 3:
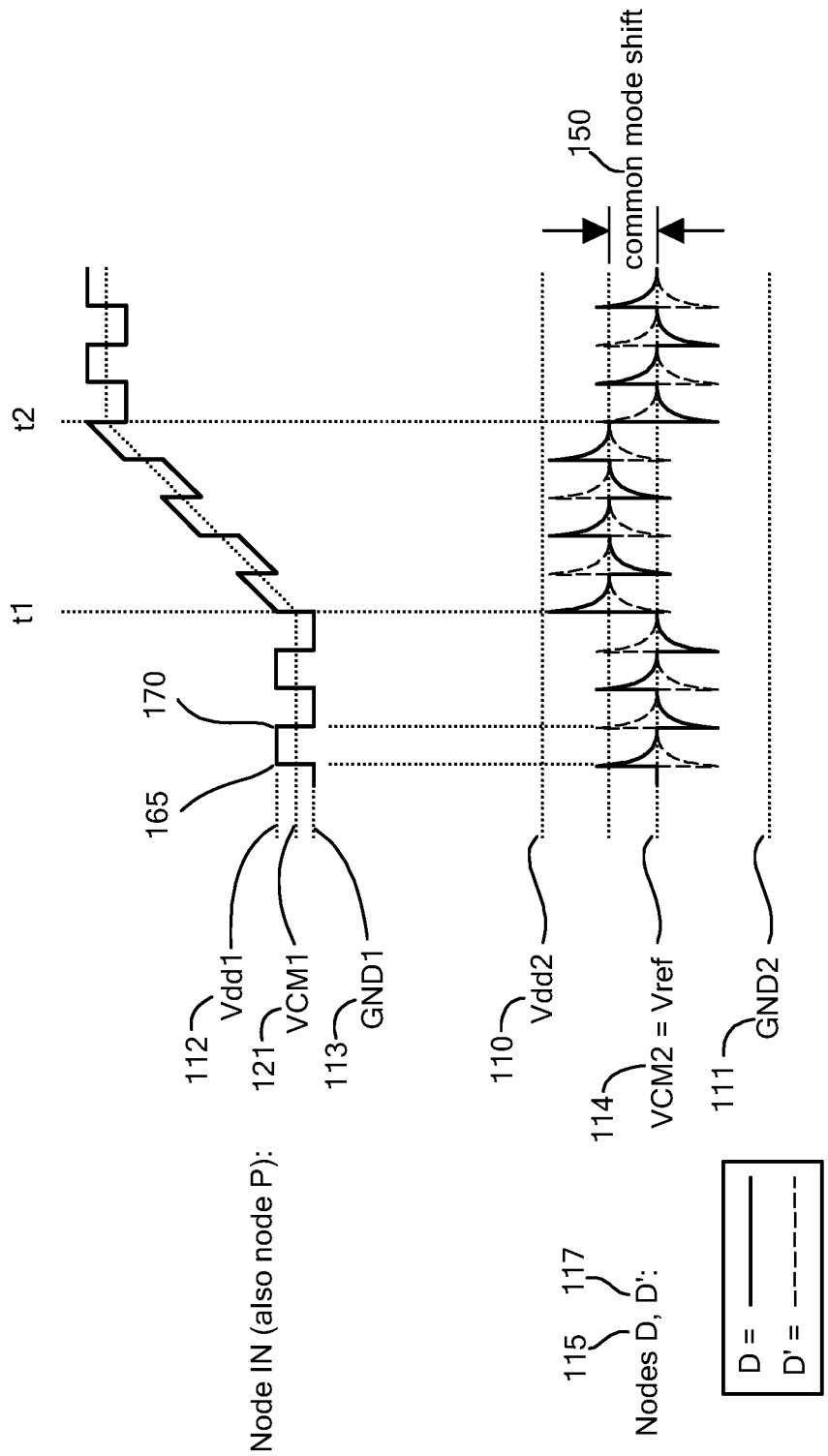
FIG. 3 illustrates example waveforms of voltage signals generated by the prior art capacitive isolator of FIG. 2 during a common-mode input change.

FIG. 3 illustrates example waveforms of the supply voltages 110, 111, 112, 113 of the circuit 100 illustrated in FIG. 2 and their common mode voltages, VCM1 121 and VCM2 114. When the common mode voltage VCM1 121 of the first side 130 does not change, as is shown on the section of the waveform before time t1, the common mode voltage VCM2 (Vref) 114 also remains unchanged. Nodes D 115 and D' 117 return to VCM2 114 after transitioning at each edge of the potential at node P (FIG. 2). For example, at a first edge of node P marked 165, the voltage at node D 115 returns to VCM2 (Vref) 114 before transitioning to a voltage higher than VCM2 114. The voltage at node D 115 then decreases towards VCM2 114 until it reaches VCM2 114 at the next (second) edge marked 170. The voltage at D' 117 returns to VCM2 114 at the first edge 165 before transitioning to a voltage lower than VCM2 114. The voltage at node D' 117 then increases towards VCM2 114 until it reaches at the second edge 170. When edges 165, 170 are present at node P, the difference between D 115 and D' 117 can be substantially instantaneously detected by the comparators in the receiver circuit 104 (FIG. 2). When the difference between the voltage at D 115 and D' 117 is greater than zero (D−D'>0), the edge of node P or is positive, and when the difference is less than zero (D−D'<0), the edge of node P is negative.

At time t1, the change in VCM1 121 causes common-mode current to flow through both capacitors 108*a*, 108*b* and the input resistors 120*a*, 120*b* increasing the voltage at nodes D 115 and D' 117 relative to VCM2 114 thereby increasing or shifting the common mode voltage an amount at those nodes. The current in capacitors 108*a*, 108*b* is proportional to a slope of the voltage and therefore increases as the slope of VCM1 121 increases. The voltage increase at nodes D 115 and D' 117 is represented in FIG. 3 as the common mode shift 150. The shift in common-mode signal is problematic for the receiver circuit 104 because it can shift the input operating range of the comparators in the receiver circuit. When there are fast common-mode transitions at the isolator input, this problem becomes worse thereby causing larger common mode variation across the resistors 120a, 120b. Decreasing the value of the resistors 120a, 120b can reduce the common mode shift, but this comes at the expense of a smaller differential receiver circuit 104 input signal (D-D'), increasing the likelihood of undetected input signal edges. Although FIG. 3 depicts a change in the input common mode signal, the same problem exists for a change in the output common mode signal. Any change in one common mode signal relative to the other will induce common-mode current through the capacitors 108a, 108b and therefore change the common mode signal at the input of the receiver circuit 104. Another drawback of the isolator circuit 100 of FIG. 2 is that the comparator input signal is attenuated by parasitic capacitance at nodes D, D'. Parasitic capacitance forms a simple capacitive voltage divider that decreases the input signal by a factor approximately equal to one minus the ratio of parasitic capacitor to isolation capacitor.

Figure 4:
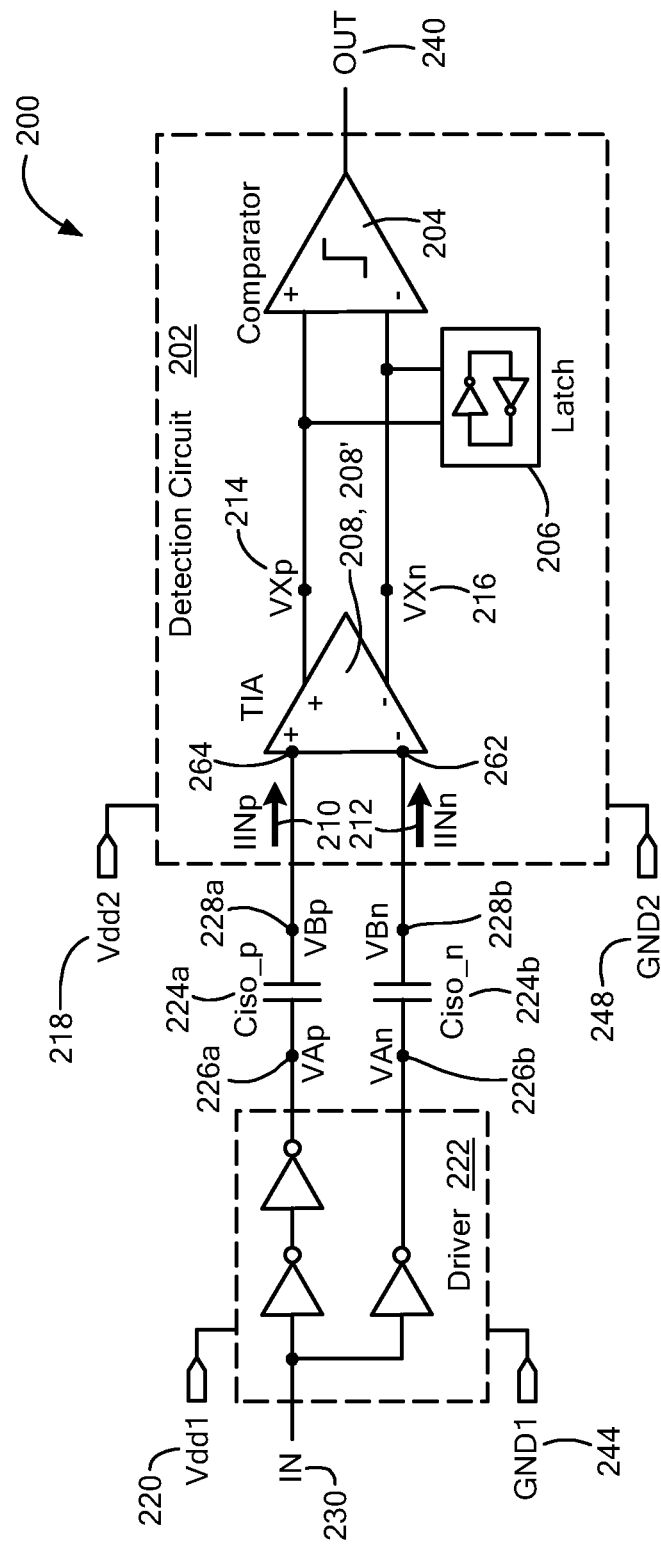
FIG. 4 is a block diagram depicting an isolator.

Illustrated in FIG. 4 is an improved isolation system 200 according to the disclosure as may be used to provide the output isolators 20 and/or the input isolators 25 of FIG. 1. The isolation system 200 reduces shifts in the common mode voltage caused by common mode input transient voltages and is less sensitive to parasitic capacitances that attenuate the signal input into the detection circuit 202 as compared to the circuit 100 of FIG. 2. Included in the isolation system 200 is a driver circuit 222 that is powered by voltages Vdd1 220 and GND1 244 and is biased at a first common mode voltage that can be an average of Vdd1 220 and GND1 244 and can vacillate or swing between a minimum and maximum voltage determined by the values of Vdd1 220, GND1 244 and any associated transient voltages. The driver circuit 222 receives a digital input signal at node IN 230 and creates a differential version of the input signal at its differential output nodes VAp 226a and VAn 226b, i.e. a differential output voltage. In the application of FIG. 1, when isolation system 200 provides the output isolator 20, the digital input signal IN can be a voltage level provided by the ADC and representative of the voltage across the sense resistor 40. In this same application, when isolation system 200 provides the input isolator 25, the digital input signal IN can be a clock signal generated by the digital signal processing and control block 55 for use by the AFE clocking circuitry.

A detection circuit 202 can be included in the isolation system 200 to receive, amplify and process the differential output of the isolation capacitors Ciso_p 224a and Ciso_n 224b in order to thereby restore the logic level of the input signal at node IN 230. The detection circuit 202 can be powered by voltages Vdd2 218 and GND2 248 and biased at a second common mode voltage that can be an average of Vdd2 218 and GND2 248 and can vacillate or swing between a minimum and maximum voltage determined by the values of Vdd2 218, GND2 248 and any associated transient voltages. At points in time during operation of the isolation system 200 the first common mode voltage of the driver 222 can be substantially the same as the common mode voltage of the detection circuit 202. At other points in time, the two common mode voltages can be different. Referring to two values, and in this instance the two common mode voltages, as "substantially similar," means that the two values are either the same or different by a negligible amount that is within a differential tolerance. The application or context within which the two values are used dictates what the differential tolerance can be. For example, two common mode voltages can be substantially similar when their values differ by plus or minus ten percent (10%).

The differential voltage signals at nodes VAp 226a and VAn 226b are received by a pair of isolation capacitors Ciso_p 224a and Ciso_n 224b that isolate the driver circuit's driver differential output voltage biased at the first common mode voltage from the components in the detection circuit 202 which are biased at a second common mode voltage. Isolation is accomplished by connecting one terminal of the first capacitor (Ciso_p 224a) to node VAp 226a, and the other terminal to node VBp 228a, and doing the same with the second capacitor by connecting one terminal of that capacitor (Ciso_n 224b) to node VAn 226b and the other terminal to node VBn 228b. Thus, the first and second capacitors 224a, 224b receive the differential output voltage from the driver circuit 222 and pass along a capacitively modified differential signal in the form of differential currents, IINp 210 and IINn 212. For example, the capacitors 224a, 244b can have a capacitance value in a range of ten femtofarads (10 fF) to one picofarad (1 pF) and they can withstand voltages as large as the difference between the two common mode voltages, i.e. eighty volts.

A transimpedance amplifier (TIA) 208, 208' in the detection circuit 202 can receive the differential currents, IINp 210 and IINn 212, created by the isolation capacitors 224a, 224b at its differential inputs 264 and 262. TIA 208, 208' can be implemented with a TIA embodiment 208 shown in FIG. 5A or a TIA embodiment 208' having additional features and shown in FIG. 6A. In connection with FIG. 4, the TIA can be referred to generally as TIA 208. The TIA 208 receives input currents 210, 212, converts them to voltages, amplifies the voltages and outputs them as differential output voltages at nodes VXp 214 and VXn 216. To reduce the effect of transient voltages at nodes VAp 226a and VAn 226b on the voltage at nodes VBp 228a and VBn 228b, the TIA 208 has a low input impedance. While the TIA 208 has a low input impedance, this impedance is not infinitely low or near zero, especially for high-frequency signals. Consequently, for fast, high-frequency inputs, at least a portion of the transient input signals received at nodes VAp 226a and VAn 226b are transferred to nodes VBp 228a and VBn 228p and therefore the differential inputs 264, 262 of the TIA 208. As a result, the voltage at nodes VBp 228a and VBn 228p are not entirely constant and therefore vary with the common mode input current and voltage.

The differential output voltage at nodes VXp 214 and VXn 216 are received by a latch circuit 206 in the detection circuit 202. This differential output voltage may lack the defined logic levels of the original digital input signal received at node IN 230 of the driver circuit 222. To restore these defined logic levels, the latch circuit 206 latches or holds the differential voltage output signals generated by the TIA 208 at nodes VXp 214 and VXn 216 so that a comparator 204 can process the held differential voltages to fully restore the logic levels of the latched, differential output voltage signal. The comparator 204 has input terminals that receive the latched differential output voltage, determines whether the latched differential output voltage is positive or negative and generates a digital output signal based on the determination. This digital output signal is provided at the OUT node 240 of the comparator 204 and has restored logic states. The logic levels of the digital output signal generated by the comparator 204 have a predetermined relationship to the logic levels of the digital input signal provided to the IN node 230 of the driver circuit 222. For example, the voltage of the digital input signal at IN 230 and the voltage of the digital output signal at OUT 240 can be different or the same but the signals can have related logic levels. The logic level of the of the digital input signal at IN 230 can be the same or the inverse of the logic level of the digital output signal at OUT 240. It should be appreciated that the comparator 204 can be any device capable of comparing differential voltages to generate an output signal with logic levels. In some embodiments, the comparator 204 can have a standard, non-clocked comparator architecture.

Figure 5A:
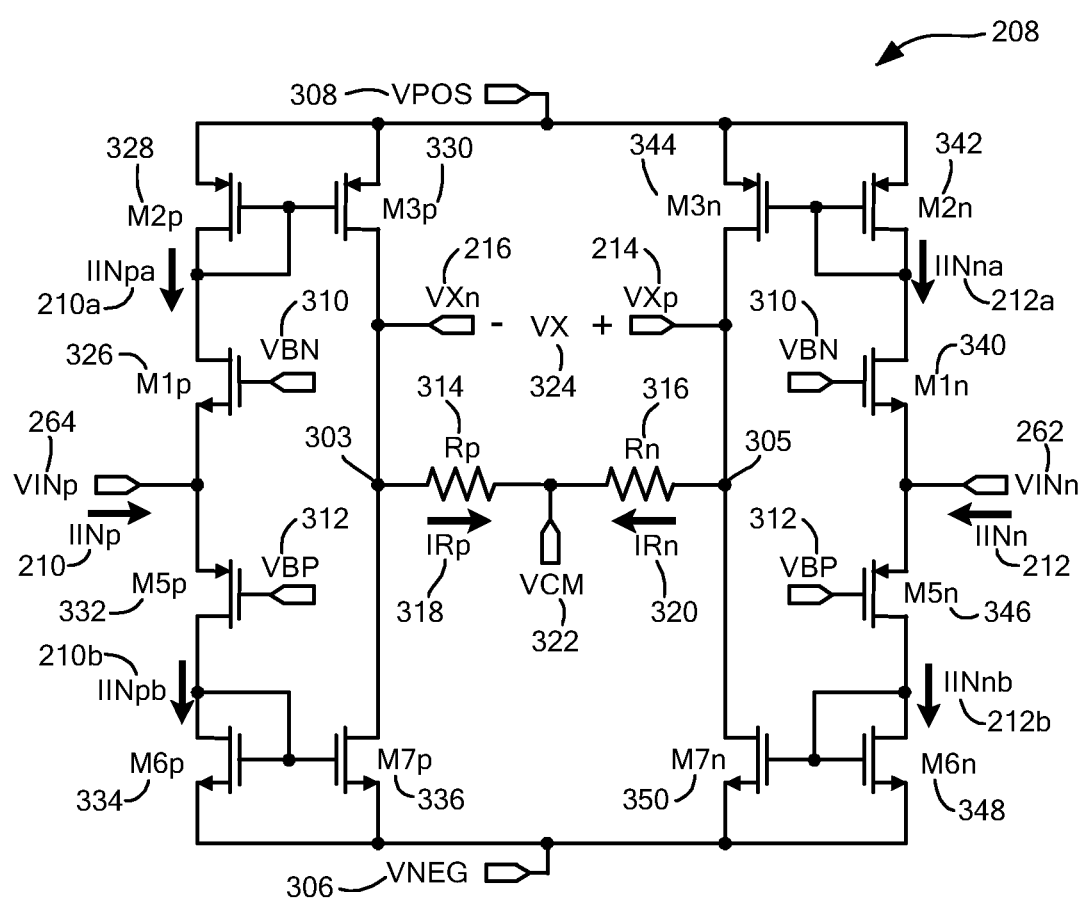
FIG. 5A is a circuit diagram depicting an embodiment of a transimpedance amplifier.

FIG. 5A illustrates an embodiment of a transimpedance amplifier (TIA) 208. In this embodiment, each differential input current 210, 212 is received by the differential input terminals 264 and 262 of the TIA 208. These input terminals 264, 262 have associated voltages, VINp and VINn respectively (hereinafter these terminals and their associated voltages shall be referred to as VINp 264 and VINn 262). Each differential input current 210, 212 flows through one of two pairs of field-effect transistors (FETs) that can be referred to as the input transistors. In some embodiments, the FETs can be metal-oxide-semiconductor field-effect transistors (MOSFETs), p-channel enhanced MOSFETs (PMOSFETs), or n-channel enhanced MOSFETs (NMOSFETs). In some embodiments, the pairs of FETs receiving the input currents can include one PMOSFET and one NMOSFET. For example, a first pair of input FETs can be M5p 332 and M5n 346, while a second pair of input FETs can be M1p 326 and M1n 340. In some instances, the TIA 208 can have a low input impedance that is a function of the input current such that the TIA 208 is a low power circuit that draws a low amount of current when there is no input current.

Stabilizing operation of the TIA 208 requires controlling the quiescent current, or the bias current of the TIA 208 when no input signal is present. Controlling the quiescent current can be achieved by biasing the input transistors of TIA 208 at voltages VBN 310 and VBP 312, which also adjusts the common-mode input voltage at the input terminals VINp 264 and VINn 262. For example, FETs M5p 332 and M5n 346 are biased at voltage VBP 312 by applying VBP 312 to their gate terminals, and FETs M1p 326 and M1n 340 are biased at voltage VBN 310 by applying VBN 310 to their gate terminals. The values chosen for VBP 312 and VBN 310 control an amount of the quiescent current through the input transistors (i.e. M5p 332, M5n 346, M1p 326, M1n 340). Additionally, biasing the pairs of FETs at VBP 312 and VBN 310 adjusts the common-mode input voltage, VCM 322, and creates a low impedance at input terminals VINp 264 and VINn 262 to correct for the common mode shift 150 (FIG. 3) experienced by the prior art isolation system (FIG. 2).

Figure 5B:
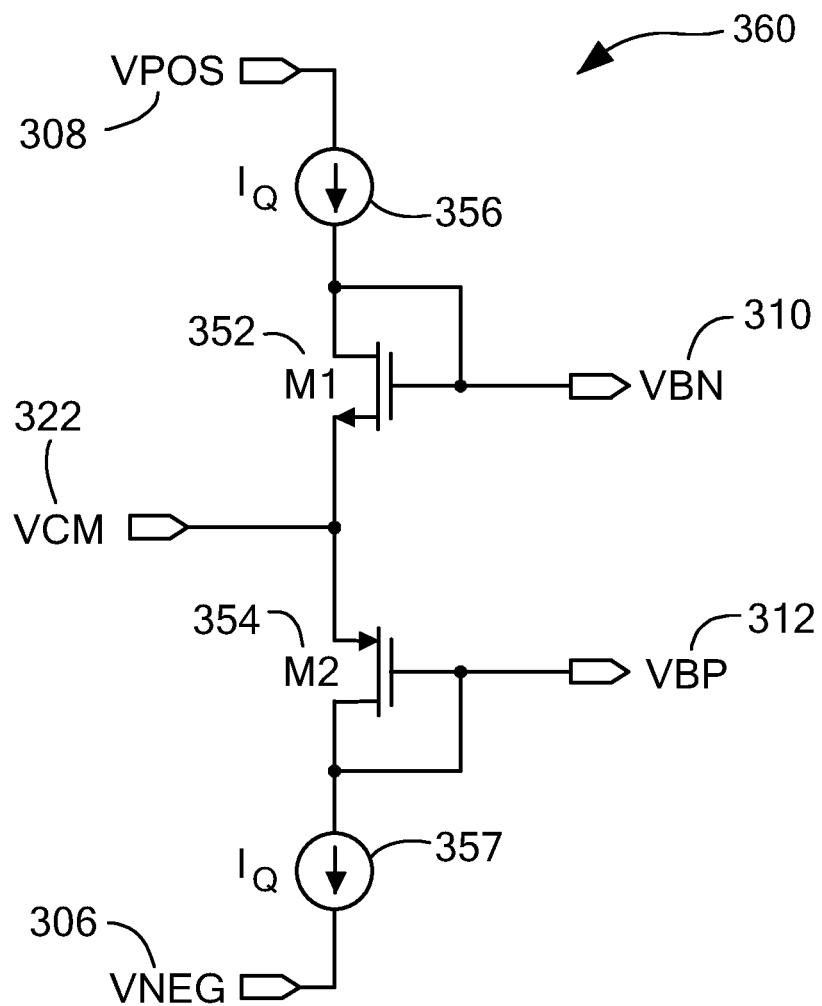
FIG. 5B is a diagram of an embodiment of a circuit for generating transimpedance amplifier bias voltages.

FIG. 5B illustrates a circuit 360 that can be a bias generator that is used to generate the bias voltages VBN 310 and VBP 312 based in part on VCM 322 which is derived from VPOS 308 and VNEG 306. The common mode voltage, VCM 322, of the TIA 208 and this bias generator circuit 360, is the average of VPOS 308 and VNEG 306, i.e. ½(VPOS+VNEG). While this is the common mode voltage illustrated in FIG. 5B, it should be appreciated that VCM 322 can be any voltage. In some embodiments, the circuit 360 is connected to voltage other than VCM 322 such that the voltage used to generate VBN 310 and VBP 312 is created from a different source than the VCM 322 shown in FIG. 5A.

M1 352 is a FET that is a replica of the input FET pair M1p 326 and M1n 340 (FIG. 5A), similarly M2 354 is a FET that is a replica of the input FET pair M5p 332 and M5n 346 (FIG. 5A). M1 352 and M2 354 can be diode-connected FETs and can further be any FET described herein. A diode-connected FET is a FET that has a gate connected to its drain such that the FET always operates in saturation and exhibits behavior similar to a p-n junction diode. Included within the bias generator 360 is a quiescent current sink 357 that conducts a quiescent current, $I_Q$, and a quiescent current source 356 that also conducts a quiescent current, $I_Q$. M2 354, i.e. a first diode-connected FET, is connected to the quiescent current sink 357 to modify the quiescent current of M2 354. M1 352, a second diode-connected FET, has a source terminal that is connected to the source terminal of M2 354 at the common mode voltage node, VCM, 322. M1 352 is further coupled to the quiescent current source 356 that generates $I_Q$ to modify the quiescent current of M1 352. The gate terminal of M1 352 is connected to one of the bias voltages, VBN 310, while the gate terminal of M2 354 is connected to the other bias voltage, VBP 312.

By connecting the NMOSFET gates together, i.e. M1p 326 and M1n 340, via node VBN 310 while connecting the PMOSFET gates together, i.e. M5p 332 and M5n 346, the TIA 208 is designed such that nodes VINp 264 and VINn 262 are biased at VCM 322. Furthermore, by connecting the input FETs in this manner, the TIA 208 is designed to assure that all currents flowing into input transistors, i.e. IINpa 210a, IINpb 210b, IINna 212a and IINnb 212b, are equal to the quiescent current sink $I_Q$ 356 and 357 when the input current (i.e. IINp 210 and IINn 212) is zero. The TIA 208 input common mode voltage and the current in the input transistors of TIA 208 can be controlled. It should be noted that while the biasing controls the input common mode voltage of the TIA 208, the output common mode voltage can be controlled by applying VCM 322. Furthermore, $I_Q$ 356 and 357 can be chosen to be a small value, such as a value less than ten microamperes (10 µA), so that the current draw is low during standby, which occurs when there are no transitions of input signal 230 of the isolator system 200 (FIG. 1) and therefore no input current to the TIA 208.

Further referring to FIG. 5A, and in more detail, a first portion of a differential input current, IINp 210 can be received at a terminal 264 of the TIA 208 such that, if IINp 210 is positive, a positive input current, IINpb 210b, can be conducted at a source terminal of input FET M5p 332, and if IINp 210 is negative, a positive input current, IINpa 210a, can be conducted at a source terminal of input FET M1p 326. IINpb 210b can flow through M5p 332 toward VNEG 306, while IINpa 201a can flow from VPOS 308 through M1p 326.

When IINp 210 is positive, the positive current IINpb 210b flows through M5p 332 and through a current mirror that includes FET M6p 334 and FET M7p 336 ("M6p/M7p current mirror"). The M6p/M7p current mirror generates a copy or mirrored version of the positive current IINpb 210b which flows toward resistor Rp 314. When IINp 210 is negative, the negative current IINpa 210a flows through M1p 326 and through a current mirror that includes FET M2p 328 and FET M3p 330 ("M2p/M3p current mirror"). The M2p/M3p current mirror generates a copy or mirrored version of the negative current IINpa 210a which flows toward resistor Rp 314. The mirrored version of IINp 210 reaches node VXn 216 (also labeled as node 303) and flows through resistor Rp 314 as IRp 318 to generate the negative portion of an output differential voltage, VXn 216.

The second differential input current, IINn 212 can be received at terminal 262 of the TIA 208 such that if IINn 212 is positive, a positive input current, IINnb 212b, can be conducted at a source terminal of input FET M5n 346, and if IINn 212 is negative, a negative input current, IINna 212a, can be conducted at a source terminal of input FET M1n 340. IINnb 212b can flow through M5n 346 toward VNEG 306, while IINna 212a can flow from VPOS 308 through M1n 340.

When IINn 212 is positive, the positive current IINnb 212b flows through M5n 346 and through a current mirror that includes FET M6n 348 and FET M7n 350 ("M6n/M7n current mirror"). The M6n/M7n current mirror generates a copy or mirrored version of the positive current IINnb 212b which flows toward resistor Rn 316. When IINn 212 is negative, the negative current IINna 212a flows through M1n 340 and through a current mirror that includes FET M2n 342 and FET M3n 344 ("M2n/M3n current mirror"). The M2n/M3n current mirror generates a copy or mirrored version of the negative current IINna 212a which flows toward resistor Rn 316. The mirrored version of IINn 212 reaches node VXp 214 (also labeled as node 305) and flows through resistor Rn 316 as IRn 320 to generate the positive portion of an output differential voltage, VXp 214.

The resistors, Rp 314 and Rn 316 can each have a first terminal coupled to its respective current mirrors and a second terminal coupled to a common mode voltage node, VCM 322. For example, Rp 314 can have one terminal connected to the output of the M2p/M3p and M6p/M7p current mirrors at node 303 and the other terminal connected to VCM 322. Rn 316 can have one terminal connected to the output of the M2n/M3n and M6n/M7n current mirrors at node 305 and the other terminal connected to VCM 322. The differential output voltage, VX 324, is generated by the current signals IRp 318 and IRn 320, which are mirrored versions of the input current signals IINp 210 and IINn 212, flowing through each resistor Rp 314 and Rn 316. In some instances, Rp 314 can have the same resistance as Rn 316, while in other embodiments Rp 314 and Rn 316 can have different resistance values which are chosen so as to provide a sufficient differential output signal in response to differential input and to sufficiently suppress the common mode output signal in response to common mode input.

When a portion of the differential current is positive, the current through its applicable resistor can be the inverse of the differential current. For example, the current, IRp 318, through Rp 314 is equal to negative IINp 210 whether the differential input current IINp 210 is negative or positive. Similarly, the current, IRn 320, through Rn 316 is equal to negative IINn 212 whether the differential input current IINn 212 is negative or positive. Regardless of the polarity of the differential input current, the polarity of the current through the resistors is the inverse of the input current.

The differential output signal of the TIA 208 is VX 324. This output signal is equal to the difference between the differential voltages on either side of the TIA 208, i.e. VX=VXp−VXn. VXp 214 is equal to the voltage drop across Rn 316 plus the common mode voltage, VCM 322, i.e. VXp=(IRn*Rn)+VCM. VXn 216 is equal to the voltage drop across Rp 314 plus the common mode voltage, i.e. VXn=(IRp*Rp)+VCM. For each equation, it is assumed that the resistance values are equal such that R=Rn=Rp.

The current mirrors described herein can mirror or copy current with unity gain. In other embodiments, the gain of the current mirrors can be selected to attenuate or amplify the input current to generate a smaller or larger mirrored version of the input current at the output. When the current mirrors are scaled, a gain of k can be used to scale the gain of each current mirror, i.e. M2p/M3p, M6p/M7p, M2n/M3n and M6n/M7n. In this example, VX 324 can be equal to difference between IINp 210 and IINn 212 times the resistance value of the resistors 314, 316 and times the gain, k.

Figure 6A:
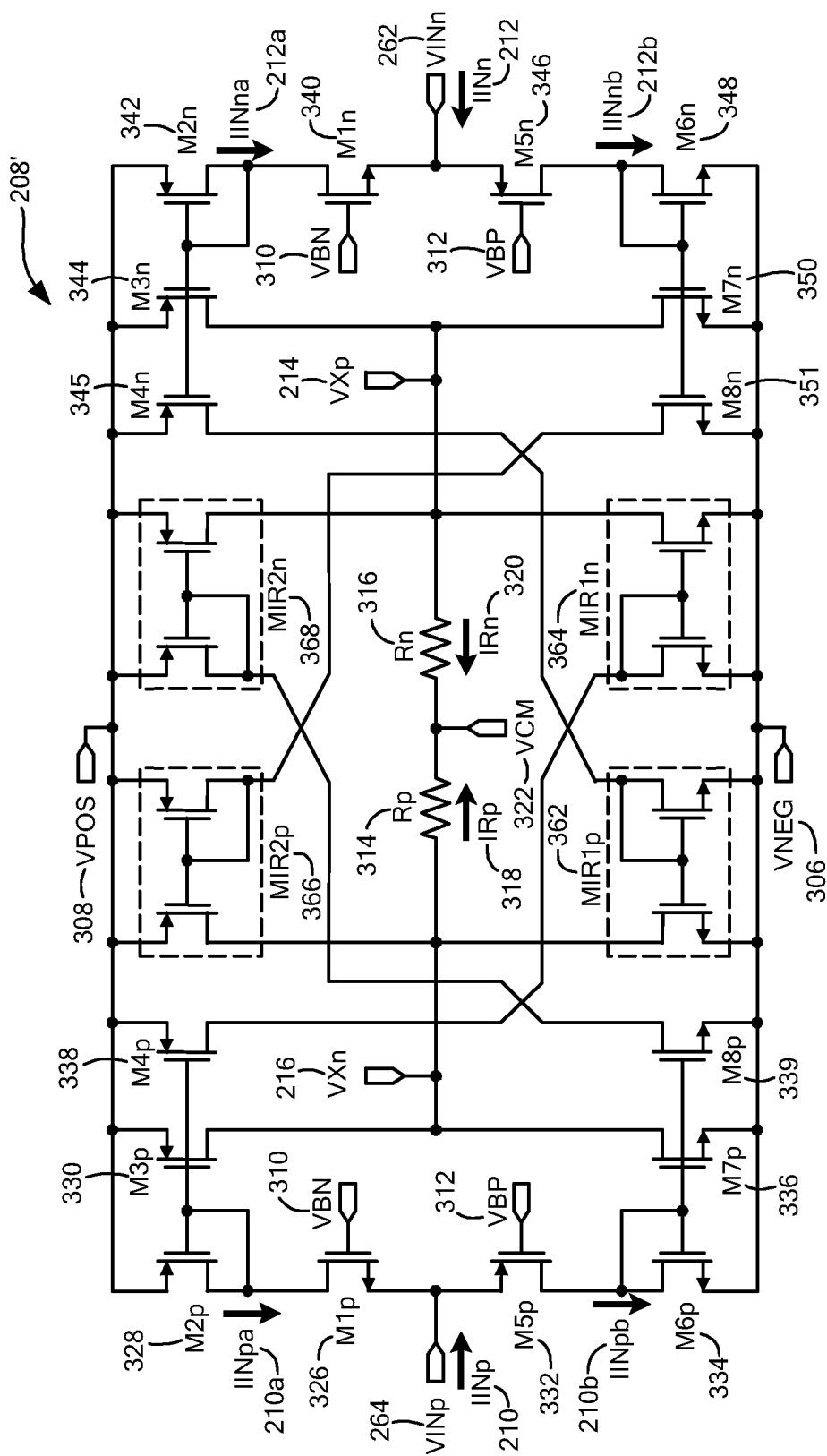
FIG. 6A is circuit diagram depicting an improved embodiment of a transimpedance amplifier.

While the TIA 208 illustrated in FIG. 5A has an improved sensitivity to parasitic capacitance on the input nodes of the detection circuit (nodes VBp 228a and VBN 228b of FIG. 4 or nodes D 115 and D' 117 of FIG. 2), its common mode output VX may vary with the common mode input current. Illustrated in FIG. 6A is another embodiment of a TIA 208' that contains additional features with respect to the TIA 208 of FIG. 5A and that may be used in the isolation system 200 of FIG. 4. The TIA 208' improves upon the TIA 208 of FIG. 5A by rejecting at least a part of the common mode input current. In general, the TIA 208' tends to cancel the common mode input current at the differential outputs of the TIA 208'. In some instances, the TIA 208' illustrated in FIG. 6A cancels substantially all the common mode input current, while in other instances, the illustrated TIA 208' (FIG. 6A) cancels only a part of the common mode input current.

The TIA 208' illustrated in FIG. 6A includes additional copier FET pairs, M4p 338 and M4n 345 and M8n 351 and M8p 339 that are coupled to the gate terminal of the current mirrors described in FIG. 5A (i.e., M2p/M3p, M6p/M7p, M2n/M3n, and M6n/M7n). For example, current copier M4p 338 is connected to current mirror M2p/M3p that includes FETs M2p 328 and M3p 330 such that M4p 338 copies the mirrored current generated by current mirror M2p/M3p. Current copier M8p 339 is connected to current mirror M6p/M7p that includes FETs M6p 334 and M7p 336 such that M8p 339 copies the mirrored current generated by current mirror M6p/M7p. On the other side of the TIA 208', current copier M4n 345 is connected to current mirror M2n/M3n that includes FETs M2n 342 and M3n 344 such that M4n 345 copies the mirrored current generated by current mirror M2n/M3n. Current copier M8n 351 is connected to current mirror M6n/M7n that includes FETs M6n 348 and M7n 350 such that M8n 351 copies the mirrored current generated by current mirror M6n/M7n.

Output from the current copiers M4p 338, M8p 339, M4n 345 and M8n 351 are fed into additional current mirrors, MIR1p 362, MIR1n 364, MIR2p 366 and MIR2n 368 which can be referred to as a second set of current mirrors. Each current mirror 362, 364, 366, 368 within this additional set of current mirrors includes two FETs, where one FET is configured to receive the portion of the differential current from a current copying FET and mirror it to the other FET in the current mirror, which is connected to the output node on the opposite side of the differential circuit. Mirroring the copied differential current amplifies the differential input currents, IINp 210 and IINn 212, and tends to cancel the common mode input current received at the differential input nodes 262, 264 of the TIA 208 (FIG. 4) at the differential outputs VXp 214 and VXn 216 of the TIA 208'. Thus, the circuitry in the TIA 208 tends to cancel the common mode input current, however from time-to-time, traces of the common mode input current arrive at the resistors, Rp 314 and Rn 316. By configuring the circuitry of the TIA 208' to at least partially cancel the common mode input current, the differential output voltage signal, VX 324 (FIG. 6A) has a relatively stable and constant common mode voltage of VCM 322. Current mirrors MIR1p 362, MIR1n 364, MIR2p 366 and MIR2n 368 can have unity gain or a gain of one. In some embodiments, other gains are possible for the added current mirrors, for example if M4n 345 is copied with a gain of one half (0.5), then MIR1p 362 can be implemented with a gain of double (2×). All other current mirrors can have a gain of k. The configuration of the TIA 208' is such that the quiescent current, $I_Q$, in the TIA 208' can be much smaller than IINp 210 and IINn 212. Furthermore, copies of $I_Q$ can be added together and canceled out at the differential outputs 214, 216 of the TIA 208'.

Figure 6B:
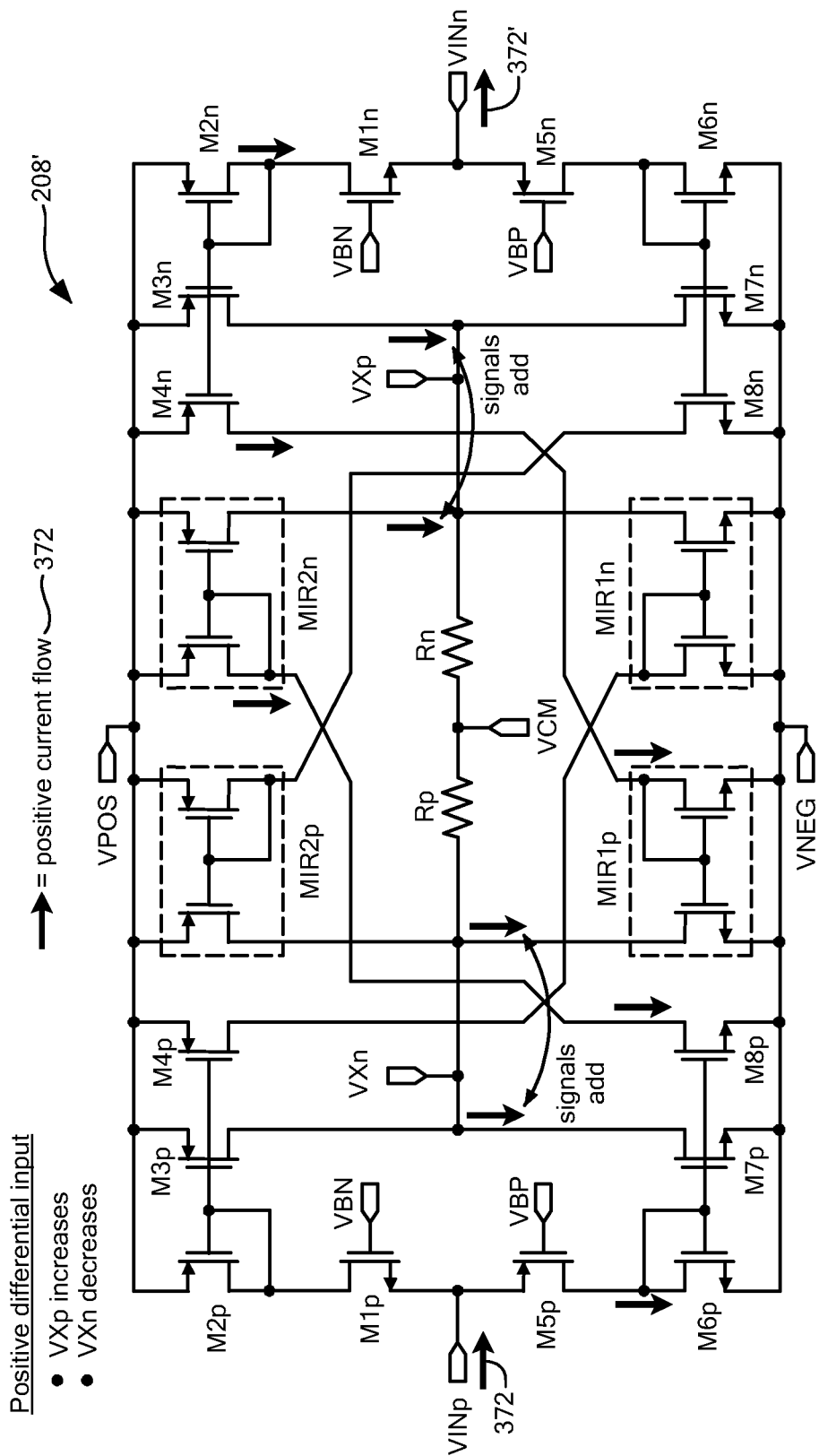
FIGS. 6B-6E are diagrams depicting current flow through the transimpedance amplifier illustrated in FIG. 6A.

Further referring to FIG. 6A, when a first portion of the differential input current IINp 210 is positive (i.e. the second portion IINn 212 is negative), IINpb 210b is equal to IINp 210. Therefore, when IINpb 210b is mirrored by M7p 336, copied by M8p 339 and mirrored by MIR2n 368, the resulting mirrored currents are equal to the gain k multiplied by IINpb 210b which is equal to IINp 210, therefore the current through M7p 336 can be demonstrated by I(M7p)=k*IINpb=k*IINp and the current through MIR2n 368 can be demonstrated by I(MIR2n)=k*IINpb=k*IINp. This relationship is illustrated in FIG. 6B which shows the flow of a positive differential input current 372 (i.e. IINpb 210b in FIG. 6A) through M6p, M7p, M8p and MIR2n of the TIA 208. In this configuration, IINn 212 is negative and IINna 212a is equal to negative IINn 212. When IINna 212a is mirrored by M3n 344, copied by M4n 345 and mirrored by MIR1p 362, the resulting mirrored currents are equal to the gain k multiplied by IINna 212 which is equal to negative IINn 212, therefore the current through M3n 344 can be demonstrated by I(M3n)=k*IINna=−k*IINn and the current through MIR1p 362 can be demonstrated by I(MIR1p)=k*IINna=−k*IINn. This relationship is illustrated in FIG. 6B which shows the flow of a negative differential input current 372' (i.e. IINna 212a in FIG. 6A) through M2n, M3n, M4n and MIR1p of the TIA 208'.

Figure 6C:
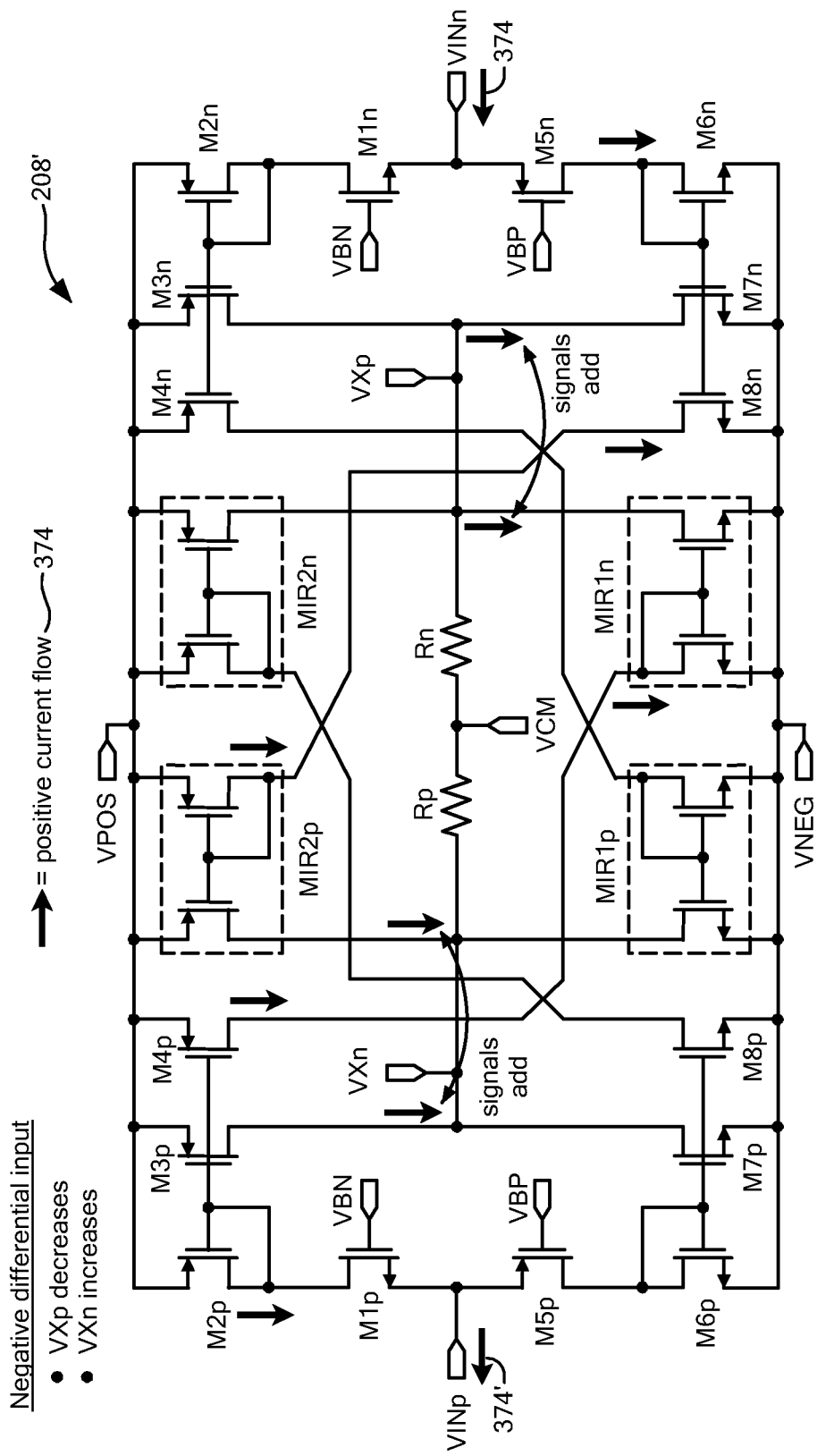

These equations are also valid when the differential input current IINp 210 is negative (i.e. IINn 212 is positive). In this instance, IINpa 210a is equal to negative IINp 210, and when IINpa 210a is mirrored by M3p 330, copied by M4p 338 and mirrored by MIR1n 364, the resulting currents can be demonstrated by I(M3p)=I(MIR1n)=k*IINpa=−k*IINp. This relationship is illustrated in FIG. 6C which shows the flow of a negative differential input current 374' (i.e. IINpa 210a in FIG. 6A) through M2p, M3p, M4p and MIR1n of the TIA 208'. In this configuration, IINn 212 is positive and IINnb 212b is equal to IINn 212. When IINnb 212b is mirrored by M7n 350, copied by M8n 351 and mirrored by MIR2p 366, the resulting currents can be demonstrated by I(M7n)=I(MIR2p)=k*IINnb=k*IINn. This relationship is illustrated in FIG. 6C which shows the flow of a positive differential input current 374 (i.e. IINnb 212b in FIG. 6A) through M6n, M7n, M8n and MIR2p of the TIA 208'.

Using these current relationships, voltages VXn 216 and VXp 214 can be calculated. For example, in the case of positive input current, the current through resistor Rp 314 can be, I(Rp)=−I(M7p)−I(MIR1p)=−k*(IINp−IINn), and the current through resistor Rn 316 can be, I(Rn)=I(M3n)+I(MIR2n)=k*(IINp−IINn). The voltage, VXp 214, can therefore be expressed as VXp=(I(Rn)*Rn)+VCM=[k(IINp−IINn)*Rn]+VCM. The voltage VXn 216 can be expressed as VXn=(I(Rp)*Rp)+VCM=[−k(IINp−IINn)*Rp]+VCM. The differential output voltage signal VX 324 (FIG. 5A) is therefore VX=VXp−VXn=2k(I1Np−IINn)*R, where R is the resistance value of either resistor 314, 316 because R=Rp=Rn. The result of 0.5*(VXp+VXn) is therefore equal to VCM 322.

Figure 6D:
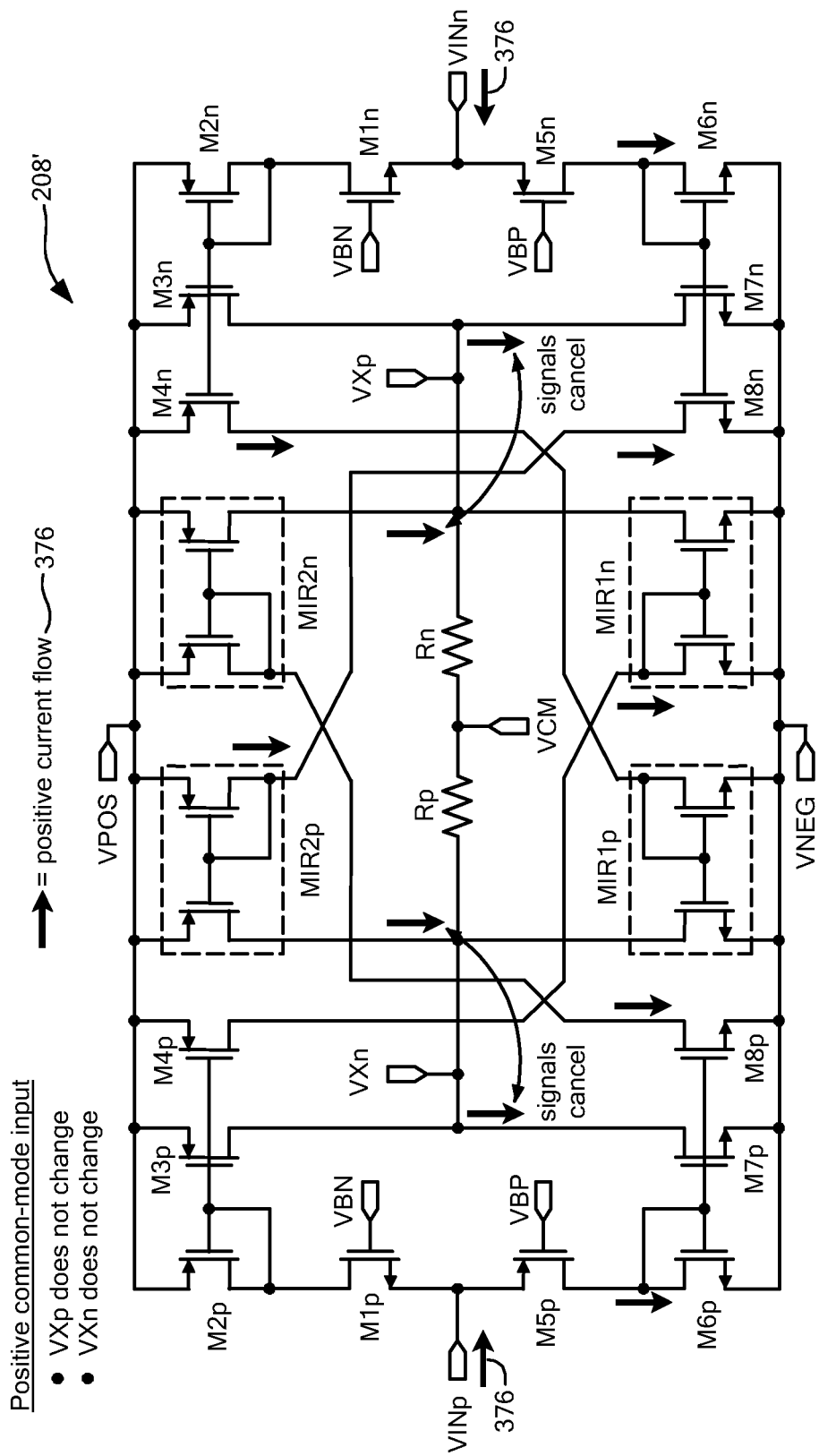
Figure 6E:
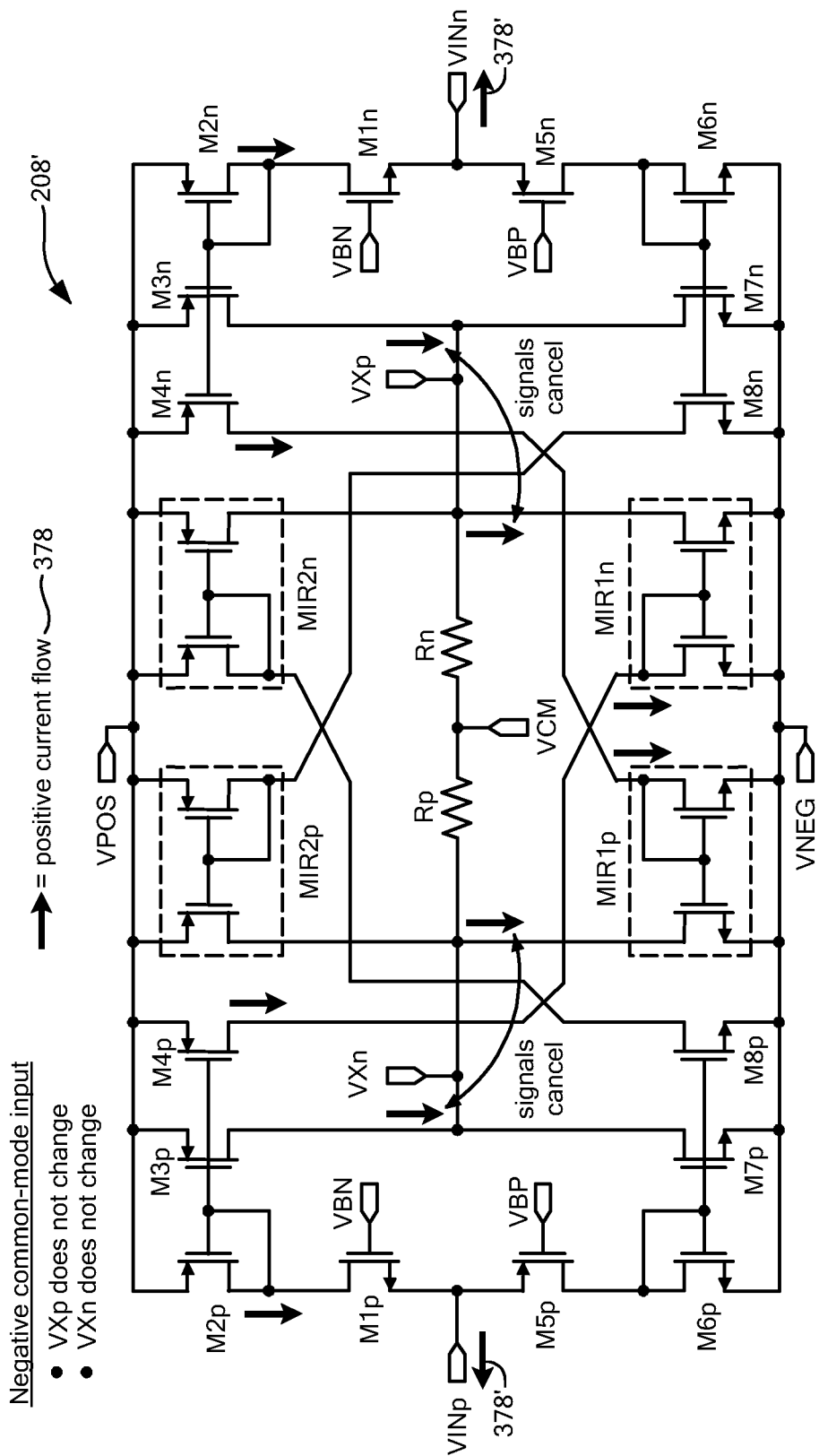

FIG. 6D provides a high level overview of current flow through aspects of the TIA 208' of FIG. 6A when the common mode input signal 376, flowing the same direction into both input terminals VINp 264 and VINn 262, is positive. As shown, the common mode input currents tend to cancel such that the currents 376 do not flow through Rp 314 and Rn 316. FIG. 6E provides a high level overview of current flow through aspects of the TIA 208' of FIG. 6A when the common mode input signal 378', flowing the same direction into both input terminals VINp 264 and VINn 262, is negative. As shown the common mode input currents also tend to cancel such that the currents 378' do not flow through Rp 314 and Rn 316. Thus, using the additional copying FETs and secondary current mirrors permits the TIA 208' to maintain a substantially constant common mode output voltage that is no longer a function of the input common mode current. When supply voltages to the isolation system 200 (FIG. 4) change relative to each other causing large common mode input currents to flow into the TIA 208', the TIA output at VXp 214 and VXn 216 (FIG. 4) remains biased in a predetermined range for the comparator 204 (FIG. 4).

The current mirror devices described in FIGS. 6A-6E should be sized such that the current mirrors can remain operational for a maximum common mode input current so that substantially all common mode currents cancel. Larger differential current signals can be permitted to saturate the current mirror devices because the latch 206 (FIG. 4) and the comparator 204 (FIG. 4) need only process binary decision values. In practice, however, current mirror mismatch and delays can cause imperfect common mode current rejection. By controlling the size and layout of the current mirrors, larger amounts of the common mode current can be rejected.

Figure 7:
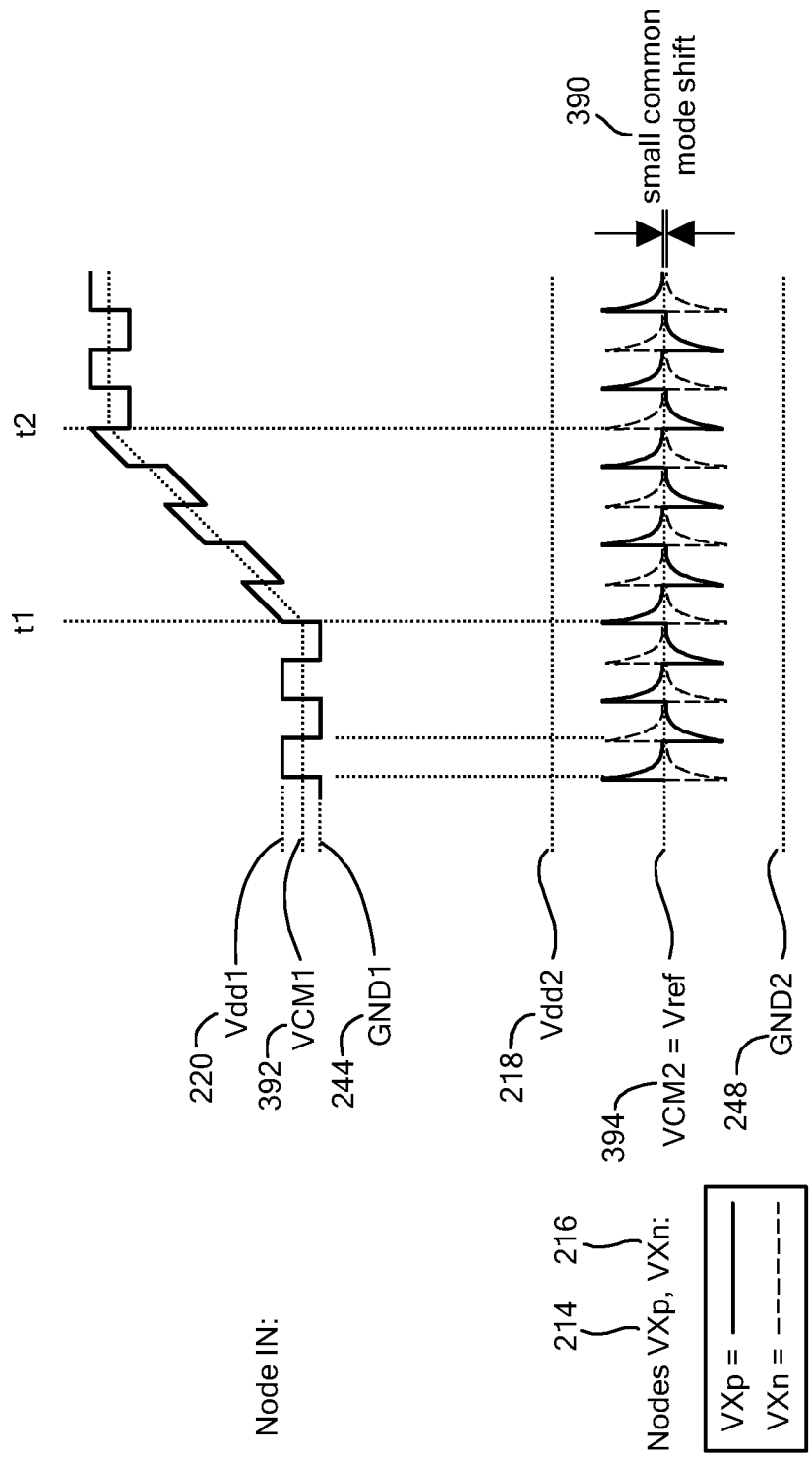
FIG. 7 is an embodiment of waveforms of voltage signals generated by the transimpedance amplifier illustrated in FIG. 6A during a common-mode input change.

FIG. 7 shows a waveform illustrating the common mode voltage, VCM1 392, of the driver circuit 222 (FIG. 4), and the common mode voltage, VCM2 394, of a detection circuit 202 (FIG. 4) that includes the transimpedance amplifier (TIA) 208' illustrated in FIG. 6A. The differential output voltage at nodes VXp 214 and VXn 216 experiences a negligible common mode shift 390. When compared to the waveform illustrated in FIG. 3 that had a large common mode shift 150 in the differential output voltage of the isolation circuit, there is almost no common mode shift 390 in the differential output of the isolation circuit 200 (FIG. 4) when the improved TIA 208' of FIG. 6A is used. Substantially all the common mode input current is rejected by the network of current mirrors and copiers in the improved TIA 208' of FIG. 6A. Additionally, the improved TIA 208' of FIG. 6A has the same low input impedance of the TIA 208 of FIG. 5A, therefore the improved TIA 208' is much less susceptible to parasitic capacitance on the receiver side of the isolation capacitors than is the Prior Art isolator system of FIG. 2.

Referring to FIG. 4, the differential output voltage of the TIA 208, 208' at nodes VXp 214 and VXn 216 has logic levels associated therewith, however the full logic levels may be lost because the TIA 208, 208' output generally does not reproduce full logic levels, and its output voltage attenuates quickly after an input edge from the isolation capacitors 224a and 224b. A comparator 204 is therefore included in the detection circuit 202 to receive the differential output voltage, i.e. VX 324 (FIG. 5A), and restore the full logic level of VX 324. Challenges can arise however when the comparator 204 processes the differential output voltage directly from nodes VXp 214 and VXn 216 because the differential output voltage attenuates quickly. Rather than use a high-cost, high-speed comparator device, a current limited latch circuit 206 is used to latch or hold the voltage signal at nodes VXp 214 and VXn 216 indefinitely or for a predetermined time period. This predetermined time period is longer than the time period during which the un-latched voltage signal would remain high or above a threshold voltage level at the nodes 214, 216. By using the latch circuit 206 to hold the differential output voltage signal at nodes VXp 214 and VXn 216 so that the differential output voltage signal does not rapidly attenuate, the comparator 204 has more time to process the signal.

Figure 8A:
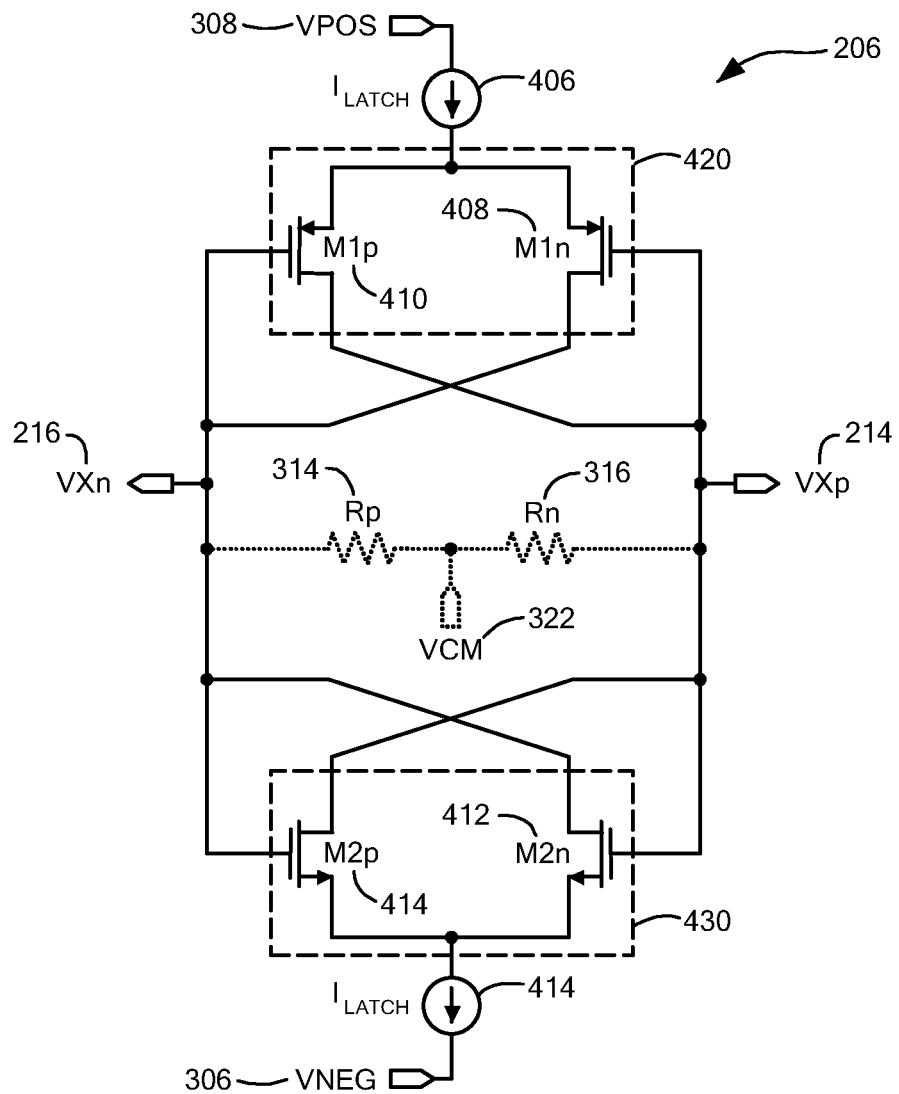
FIG. 8A is a circuit diagram of a current-limited latch.
Figure 8B:
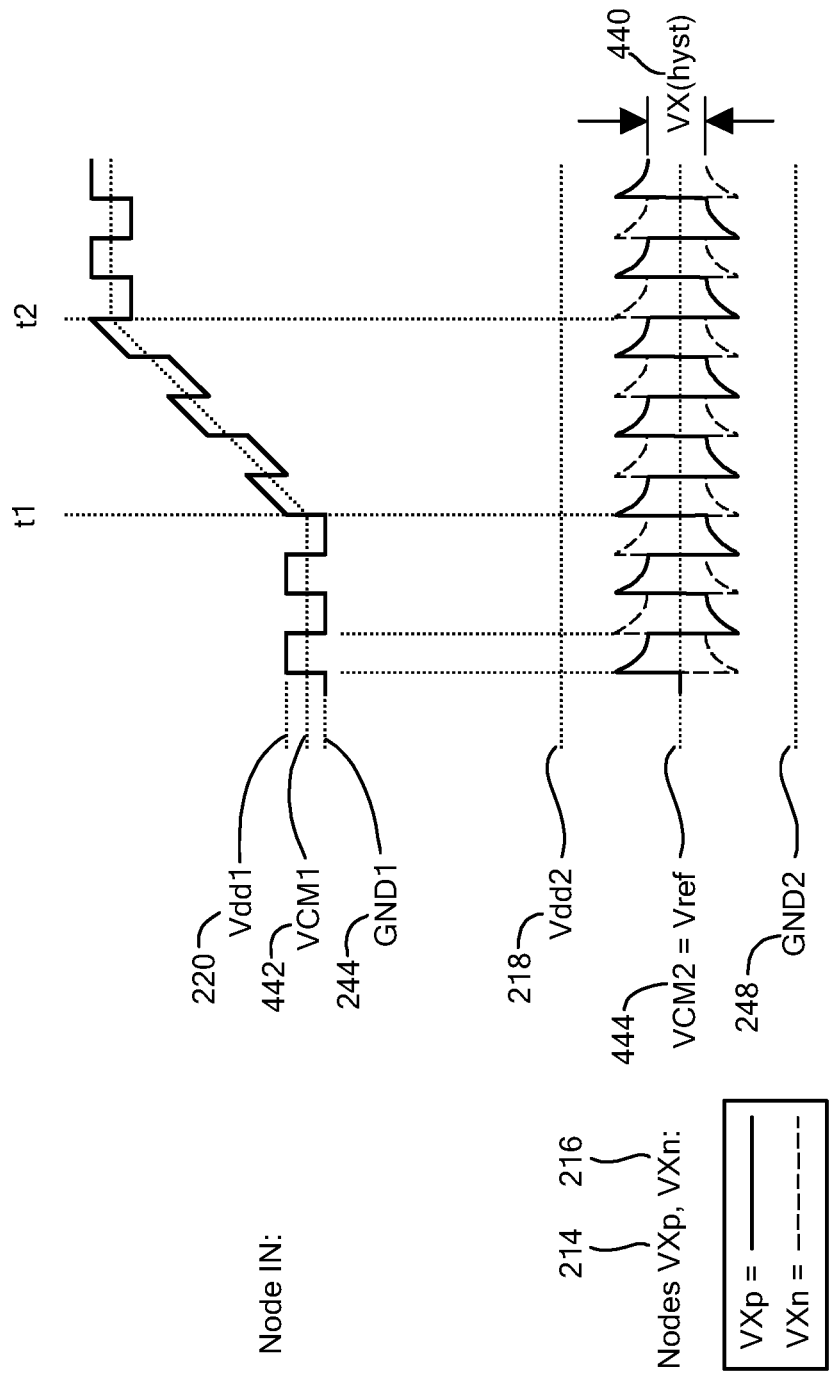
FIG. 8B illustrates example waveforms of voltage signals generated by the transimpedance amplifier illustrated in FIG. 6A during a common-mode input change when those signals are current limited using the latch illustrated in FIG. 8A.

Illustrated in FIG. 8A is a latch circuit 206 that is coupled to the differential output nodes, VXn 216 and VXp 214 of the TIA 208, 208', and to the input nodes of the comparator 204. The latch circuit 206 includes a latch current source, $I_{LATCH}$ 406 that is coupled to a first differential pair of FETs 420 that includes FET M1p 410 and FET M1n 408. The first differential pair of FETs 420 is coupled to the current source 406 and to a second differential pair of FETs 430, that include FET M2n 412 and FET M2p 414, in the latch circuit 206. The second differential pair of FETs 430 is further coupled to a latch current sink 414 that can have substantially the same current value as the latch current source 406. In some embodiments, the latch current source 406 and the latch current sink 414 are the same value, in other embodiments the latch current source 406 and the latch current sink 414 differ by a negligible amount of current. The latch current source 406 and the latch current sink 414 can have current values that are selected to control or designate a held voltage value of VX(hyst) 440 (FIG. 8B). The FETs in each pair 420, 430 can be any of the FETs described herein. In some instances, each pair 420, 430 can include an NMOSFET and a PMOSFET.

The latch circuit 206 can be integrated into the detection circuit 202 such that the LATCH 406 current flows through electrical devices within the latch circuit 206 and electrical devices within the TIA 208, 208', and the latch circuit 206 can be powered using voltage from the TIA 208, 208'. For example, the latch circuit 206 receives voltage from nodes VPOS 308 and VNEG 306 and receives the differential output voltage from VXn 216 and VXp 214. Furthermore, the $I_{LATCH}$ 406 current flows through the first differential pair of FETs 420 through the resistors 314, 316 of the TIA 208, 208' and then through the second differential pair of FETs 430. While the latch circuit 206 is illustrated in FIG. 4 as a separate circuit component, in some embodiments, the latch circuit 206 can be integrated into the TIA 208, 208'.

Further referring to FIG. 8A, when VXn 216 is less than VXp 214, the first differential pair of FETs 420 is biased so that $I_{LATCH}$ 406 flows through M1p 410 because its gate voltage is lower than the gate voltage of M1n 408. Thus, $I_{LATCH}$ 406 flows through M1p 410, through Rn 316, through Rp 314, and through M2n 412. $I_{LATCH}$ 406 flows through M2n 412 because the gate voltage of M2n 412 is higher than that of M2p 414. In the reverse, when VXn 216 is greater than VXp 214, the first differential pair of FETs 420 are biased so that $I_{LATCH}$ 406 flows through M1n 408 because it has a lower gate voltage than the gate voltage of M1p 410. $I_{LATCH}$ 406 therefore flows through M1n 408, through Rp 314, through Rn 316 and through M2p 414 because the gate voltage of M2p 414 is higher than that of M2n 412.

The latch circuit 206 has an associated hysteresis voltage, VX(hyst) 440 (FIG. 8B), that functions as a voltage threshold. At a steady state, where there is no input signal into the TIA 208, VX(hyst) 440 can be defined as the difference between VXp 214 and VXn 216 which is twice $I_{LATCH}$ multiplied by the resistance value of Rn 316 or Rp 314, i.e. VX(hyst)=VXp−VXn=2*I(LATCH)*R (it is assumed that Rp=Rn=R). VX(hyst) 440 is illustrated in FIG. 8B as a range or band of voltages removed from or filtered out of VXp 214 and VXn 216. In some embodiments, this range or band of removed voltages can reference a separately generated bandgap reference voltage by appropriate selection of TIA resistors Rp 314 and Rn 316 and latch current values for $I_{LATCH}$ 406 and 414.

VX(hyst) 440 is the predetermined value or amount, or threshold voltage that must be overcome by the differential output voltage at VXp 214 and VXn 216 to switch the state of the latch circuit 206. For example, the latch circuit 206 holds a positive differential voltage value at VXp 214 and VXn 216 until the latch circuit 206 receives a negative edge that has a value greater than VX(hyst) 440. Similarly, latch circuit 206 holds a negative differential voltage value at VXp 214 and VXn 216 until the latch circuit 206 receives a positive edge that has a value greater than VX(hyst) 440. Until that greater value is received, the latch circuit 206 holds the voltage value at the TIA 208 differential output nodes 214, 216. This functionality can be seen in FIG. 8B where the differential voltage output signals at VXp 214 and VXn 216 settle to VX(hyst) 440 rather than returning to zero.

The latch circuit 206 can be called a current-limited latch because $I_{LATCH}$ 406 limits the maximum swing, and hence the threshold voltage that must be overcome by the TIA output voltage, of its outputs. $I_{LATCH}$ can be generated or selected by placing a bandgap reference voltage across a resistor that has properties similar to those of Rp 314 and Rn 316. By referencing $I_{LATCH}$ 406 to the constant bandgap reference voltage, VX(hyst) 440 varies only slightly as the bandgap reference voltage varies. VX(hyst) 440 defines the predetermined held voltage value used to alter the state of the latch circuit 206 and therefore must remain stable such that any variation is minimal. This promotes consistent circuit performance over temperature variations and manufacturing tolerances.

Having described preferred embodiments, it will now become apparent to one of ordinary skill in the art that other embodiments incorporating their concepts may be used. Elements of different embodiments described herein may be combined to form other embodiments not specifically set forth above. Various elements, which are described in the context of a single embodiment, may also be provided separately or in any suitable sub-combination. Other embodiments not specifically described herein are also within the scope of the following claims.

It is felt therefore that these embodiments should not be limited to disclosed embodiments, but rather should be limited only by the spirit and scope of the appended claims.

It should be appreciated that the circuit architectures and methods described herein are merely embodiments of the system for isolating digital signals communicated between systems having independent common mode voltages, and that aspects can be modified while maintaining the function described. All publications and references cited herein are expressly incorporated by reference in their entirety.

What is claimed is:

1. A method comprising:
   converting, by a driver powered by a first supply having a first common mode voltage, a digital input signal having a logic level into a driver differential output voltage;
   converting, by a transimpedance amplifier having differential inputs and differential outputs and comprising, for each of the different input, a first FET configured to conduct a positive input current at the respective differential input, a second FET coupled to the first FET and to the respective differential input and configured to conduct a negative input current at the respective differential input, a first current mirror to receive a first current generated by the first FET and to generate a first mirrored version of the first current, and a second current mirror to receive a second current generated by the second FET and to generate a second mirrored version of the second current, a differential input current at the differential inputs into a differential output voltage at the differential outputs of the transimpedance amplifier; and isolating, by a pair of isolation capacitors, the driver differential output voltage from the differential inputs of the transimpedance amplifier.

2. The method of claim 1 wherein converting the differential input current comprises converting the differential input current using the transimpedance amplifier of a detection circuit powered by a second supply having a second common mode voltage.

3. The method of claim 1 wherein isolating comprises isolating using the pair of isolation capacitors each having a first terminal coupled to the driver differential output voltage and a second terminal coupled to the differential inputs of the transimpedance amplifier.

4. Apparatus comprising:
means for converting a digital input signal having a logic level into a driver differential output voltage;
means for converting, by a transimpedance amplifier having differential inputs and differential outputs and comprising, for each for each of the differential input, a first FET configured to conduct a positive input current at the respective differential input, a second FET coupled to the first FET and to the respective differential input and configured to conduct a negative input current at the respective differential input, a first current mirror to receive a first current generated by the first FET and to generate a first mirrored version of the first current, and a second current mirror to receive a second current generated by the second FET and to generate a second mirrored version of the second current, a differential input current at the differential inputs into a differential output voltage at the differential outputs of the transimpedance amplifier; and
means for isolating the driver differential output voltage from the differential inputs of the transimpedance amplifier.

5. The apparatus of claim 4 wherein the means for converting the digital input signal comprises the driver powered by a first supply having a first common mode voltage.

6. The apparatus of claim 5 wherein the means for converting the differential input current comprises a detection circuit powered by a second supply having a second common mode voltage, the detection circuit comprising the transimpedance amplifier.

7. The apparatus of claim 6 wherein means for isolating comprises a pair of isolation capacitors each having a first terminal coupled to the driver differential output voltage and a second terminal coupled to the differential inputs of the transimpedance amplifier.

8. Apparatus comprising:
a driver powered by a first supply having a first common mode voltage and configured to convert a digital input signal having a logic level into a driver differential output voltage;
a detection circuit powered by a second supply having a second common mode voltage, the detection circuit comprising a transimpedance amplifier having differential inputs and configured to convert a differential input current at the differential inputs into a differential output voltage at the differential outputs of the transimpedance amplifier, wherein the transimpedance amplifier comprises, for each of the differential inputs:
a first FET configured to conduct a positive input current at the respective differential input;
a second FET coupled to the first FET and to the respective differential input and configured to conduct a negative input current at the respective differential input;
a first current mirror to receive a first current generated by the first FET and to generate a first mirrored version of the first current; and
a second current mirror to receive a second current generated by the second FET and to generate a second mirrored version of the second current; and
a pair of isolation capacitors, each having a first terminal coupled to the driver differential output voltage and a second terminal coupled to the differential inputs of the transimpedance amplifier.

9. The apparatus of claim 8 wherein the transimpedance amplifier further comprises, coupled to the first and second current mirror for each of the differential inputs, a resistor having a first terminal coupled to the respective current mirrors and a second terminal coupled to a common mode voltage node, wherein the differential output voltage is generated by the first mirrored version of the first current and the second mirrored version of the second current flowing through the resistors.

10. The apparatus of claim 9 wherein a gate terminal of the first FET for each of the differential inputs are coupled together and to a first bias voltage and wherein a gate terminal of the second FET for each of the differential inputs are coupled together and to a second bias voltage.

11. The apparatus of claim 10 further comprising a bias generator configured to generate the first bias voltage and the second bias voltage and comprising:
a quiescent current sink;
a first diode-connected FET replicating the first FET and coupled to the quiescent current sink;
a second diode-connected FET replicating the second FET and having a source terminal coupled to a source terminal of the first diode-connected FET; and
a quiescent current source coupled to the second diode-connected FET;
wherein the first bias voltage is provided at a gate terminal of the first diode-connected FET and the second bias voltage is provided at a gate terminal of the second diode-connected FET.

12. The apparatus of claim 9 wherein the transimpedance amplifier further comprises, coupled to at least one of the current mirrors for each of the differential inputs, a current copying FET and a second current mirror configured to sum the differential input current and tend to cancel a common mode input current at the differential outputs of the transimpedance amplifier.

13. The apparatus of claim 8 wherein the second common mode voltage is different than the first common mode voltage.

14. The apparatus of claim 8 wherein the detection circuit further comprises a comparator having inputs responsive to the differential output voltage and having an output at which is provided a digital output signal having a logic level with a predetermined relationship to a logic level of the digital input signal.

15. Apparatus comprising:
a driver powered by a first supply having a first common mode voltage and configured to convert a digital input signal having a logic level into a driver differential output voltage; a detection circuit powered by a second supply having a second common mode voltage, the detection circuit comprising a transimpedance amplifier having differential inputs and configured to convert a differential input current at the differential inputs into a differential output voltage at the differential outputs of the transimpedance amplifier, wherein the detection circuit further comprises:
- a comparator having inputs responsive to the differential output voltage and having an output at which is provided a digital output signal having a logic level with a predetermined relationship to a logic level of the digital input signal; and
- a latch coupled to the differential outputs of the transimpedance amplifier and to the comparator, wherein the latch is configured to hold the differential output voltage at a predetermined voltage level in response to detection of a change in the differential output voltage of greater than the predetermined voltage level, and wherein the latch comprises:
- a latch current source;
- a first differential pair coupled to the latch current source;
- a second differential pair coupled to the first differential pair at inputs of the latch; and
- a latch current sink coupled to the second differential pair having a value substantially equal to a value of the latch current source; and
- a pair of isolation capacitors, each having a first terminal coupled to the driver differential output voltage and a second terminal coupled to the differential inputs of the transimpedance amplifier.

16. The apparatus of claim 15, wherein the latch current source and the latch current sink are controlled by a bandgap voltage coupled across a resistor and wherein the value of the latch current source, the value of the latch current sink, and a value of the resistor are selected to establish the predetermined voltage level.

17. The apparatus of claim 15 wherein the second common mode voltage is different than the first common mode voltage.

18. The apparatus of claim 15 wherein the transimpedance amplifier comprises, for each of the differential inputs:
- a first FET configured to conduct a positive input current at the respective differential input;
- a second FET coupled to the first FET and to the respective differential input and configured to conduct a negative input current at the respective differential input;
- a first current mirror to receive a first current generated by the first FET and to generate a first mirrored version of the first current; and
- a second current mirror to receive a second current generated by the second FET and to generate a second mirrored version of the second current.

19. The apparatus of claim 18 wherein the transimpedance amplifier further comprises, coupled to the first and second current mirror for each of the differential inputs, a resistor having a first terminal coupled to the respective current mirrors and a second terminal coupled to a common mode voltage node, wherein the differential output voltage is generated by the first mirrored version of the first current and the second mirrored version of the second current flowing through the resistors.

20. The apparatus of claim 19 wherein a gate terminal of the first FET for each of the differential inputs are coupled together and to a first bias voltage and wherein a gate terminal of the second FET for each of the differential inputs are coupled together and to a second bias voltage.

21. The apparatus of claim 20 further comprising a bias generator configured to generate the first bias voltage and the second bias voltage and comprising:
- a quiescent current sink;
- a first diode-connected FET replicating the first FET and coupled to the quiescent current sink;
- a second diode-connected FET replicating the second FET and having a source terminal coupled to a source terminal of the first diode-connected FET; and
- a quiescent current source coupled to the second diode-connected FET;

wherein the first bias voltage is provided at a gate terminal of the first diode-connected FET and the second bias voltage is provided at a gate terminal of the second diode-connected FET.

22. The apparatus of claim 19 wherein the transimpedance amplifier further comprises, coupled to at least one of the current mirrors for each of the differential inputs, a current copying FET and a second current mirror configured to sum the differential input current and tend to cancel a common mode input current at the differential outputs of the transimpedance amplifier.

23. A method comprising:
- converting, by a driver powered by a first supply having a first common mode voltage, a digital input signal having a logic level into a driver differential output voltage;
- converting, by a transimpedance amplifier of a detection circuit powered by a second supply having a second common mode voltage, the transimpedance amplifier having differential inputs and differential outputs, a differential input current at the differential inputs into a differential output voltage at the differential outputs of the transimpedance amplifier, the detection circuit comprising a latch coupled to the differential outputs of the transimpedance amplifier, wherein the latch is configured to hold the differential output voltage at a predetermined voltage level in response to detection of a change in the differential output voltage of greater than the predetermined voltage level, and wherein the latch comprises a latch current source, a first differential pair coupled to the latch current source, a second differential pair coupled to the first differential pair at inputs of the latch, and a latch current sink coupled to the second differential pair having a value substantially equal to a value of the latch current source; and
- isolating, by a pair of isolation capacitors, the driver differential output voltage from the differential inputs of the transimpedance amplifier.

24. The method of claim 23 wherein isolating comprises isolating using the pair of isolation capacitors each having a first terminal coupled to the driver differential output voltage and a second terminal coupled to the differential inputs of the transimpedance amplifier.

25. Apparatus comprising:
- means, powered by a first supply having a first common mode voltage, for converting a digital input signal having a logic level into a driver differential output voltage;
- means for converting, by a transimpedance amplifier of a detection circuit powered by a second supply having a second common mode voltage, the transimpedance amplifier having differential inputs and differential outputs having differential inputs and differential outputs, a differential input current at the differential inputs into a differential output voltage at the differential outputs of the transimpedance amplifier, the detection circuit comprising a latch coupled to the differential outputs of the transimpedance amplifier, wherein the latch is configured to hold the differential output voltage at a predetermined voltage level in response to detection of a change in the differential output voltage of greater than the predetermined voltage level, and wherein the latch comprises a latch current source, a first differential pair coupled to the latch current source, a second differential pair coupled to the first differential pair at inputs of the latch, and a latch current sink coupled to the second differential pair having a value substantially equal to a value of the latch current source; and means for isolating the driver differential output voltage from the differential inputs of the transimpedance amplifier.

26. The apparatus of claim 25 wherein means for isolating comprises a pair of isolation capacitors each having a first terminal coupled to the driver differential output voltage and a second terminal coupled to the differential inputs of the transimpedance amplifier.

27. The apparatus of claim 25 wherein the transimpedance amplifier further comprises, for each of the differential inputs:

means for conducting a positive input current at a first differential input;

means for conducting a negative input current at a second differential input;

means for generating a first mirrored version of the positive input current; and means for generating a second mirrored version of the negative input current.

\* \* \* \* \*

UNITED STATES PATENT AND TRADEMARK OFFICE
CERTIFICATE OF CORRECTION

PATENT NO. : 11,228,466 B2
APPLICATION NO. : 16/526081
DATED : January 18, 2022
INVENTOR(S) : Craig S. Petrie et al.

It is certified that error appears in the above-identified patent and that said Letters Patent is hereby corrected as shown below:

In the Specification

Column 4, Line 16 delete "FIG. 6A is circuit" and replace with --FIG. 6A is a circuit--.

Column 4, Line 61 delete "winding of the motor 80." and replace with --winding 80 of the motor.--.

Column 6, Line 52 delete "P or is" and replace with --P is--.

Column 8, Line 41 delete "228$p$" and replace with --228$b$--.

Column 8, Line 43 delete "228$p$" and replace with --228$b$--.

Column 10, Line 45 delete "201$a$" and replace with --210$a$--.

Column 11, Lines 65-66 delete "to difference" and replace with --to the difference--.

Column 13, Line 56 delete "2k(I1Np" and replace with --2k(IINp--.

Column 13, Line 62 delete "flowing the" and replace with --flowing in the--.

Column 14, Line 1 delete "flowing the" and replace with --flowing in the--.

In the Claims

Column 20, Lines 63-65 In Claim 25 delete "having differential inputs and differential outputs having differential inputs and differential outputs," and replace with --having differential inputs and differential outputs,--.

Signed and Sealed this
Twenty-eighth Day of February, 2023

Katherine Kelly Vidal
*Director of the United States Patent and Trademark Office*